US010151928B2

(12) United States Patent
Ushakov

(10) Patent No.: US 10,151,928 B2
(45) Date of Patent: Dec. 11, 2018

(54) SMART GLASSES WITH A FIXED FRAME AND A ROTATABLE FRAME

(71) Applicant: Alexey Leonidovich Ushakov, Moscow (RU)

(72) Inventor: Alexey Leonidovich Ushakov, Moscow (RU)

( * ) Notice: Subject to any disclaimer, the term of this patent is extended or adjusted under 35 U.S.C. 154(b) by 0 days.

(21) Appl. No.: 15/965,896

(22) Filed: Apr. 28, 2018

(65) Prior Publication Data

US 2018/0246335 A1    Aug. 30, 2018

Related U.S. Application Data

(63) Continuation-in-part of application No. 15/688,968, filed on Aug. 29, 2017, now Pat. No. 10,067,359, and a continuation-in-part of application No. 15/449,613, filed on Mar. 3, 2017, now Pat. No. 10,082,681, which is a continuation of application No. (Continued)

(30) Foreign Application Priority Data

Sep. 9, 2014   (RU) ................................ 2014113968
Jul. 5, 2017   (RU) ................................ 2017123756

(51) Int. Cl.
| G02B 27/01 | (2006.01) |
| H04N 5/225 | (2006.01) |
| G06F 1/16 | (2006.01) |
| H04M 1/05 | (2006.01) |
| G08C 17/02 | (2006.01) |
| H04N 5/232 | (2006.01) |
| G02C 11/00 | (2006.01) |
| H04M 1/15 | (2006.01) |

(52) U.S. Cl.
CPC ......... *G02B 27/0176* (2013.01); *G06F 1/163* (2013.01); *G08C 17/02* (2013.01); *H04M 1/05* (2013.01); *H04N 5/2251* (2013.01); *H04N 5/2252* (2013.01); *G02B 2027/0178* (2013.01); *G02C 11/10* (2013.01); *H04M 1/15* (2013.01); *H04N 5/23293* (2013.01)

(58) Field of Classification Search
CPC ........ G02B 27/0176; G02B 2027/0178; G08C 17/02; H04N 5/2252; H04N 5/2251; H04N 5/23293; H04M 1/05; H04M 1/15; G06F 1/163; G02C 11/10
USPC ......................................... 351/120, 149–151
See application file for complete search history.

(56) References Cited

U.S. PATENT DOCUMENTS

| 3,252,747 A * | 5/1966 | Robins ..................... G02C 7/06 351/57 |
| 6,767,095 B1 * | 7/2004 | Altelaar ................... G02C 7/16 351/44 |

* cited by examiner

*Primary Examiner* — Mekonnen D Dagnew
(74) *Attorney, Agent, or Firm* — Bardmesser Law Group

(57) ABSTRACT

A rotary smart glasses include a neck band configured to bear electronic components and control means, a spectacles comprising a fixed frame and a movable frame with near-eye displays, a flexible adapter comprising two wires connecting the spectacles and the neck band, wherein the movable frame is secured to the fixed frame by a multi-lever mechanism and is configured to be lifted up relative to the fixed frame and simultaneously to be rotated about its longitudinal axis owing to hinges located in points of securing the levers to the frames. The invention allows lifting near-eye displays over the user's forehead preventing contact between the inner surface of the displays and the forehead, and thus avoiding contamination of the displays. The neck band allows use of more powerful hardware, extra batteries, and/or a microphone array.

23 Claims, 20 Drawing Sheets

Related U.S. Application Data

14/541,873, filed on Nov. 14, 2014, now Pat. No. 9,612,440.

SMART GLASSES WITH A FIXED FRAME AND A ROTATABLE FRAME

CROSS-REFERENCE TO RELATED APPLICATIONS

This application is a continuation in part of U.S. patent application Ser. No. 15/688,968, entitled EYEGLASSES WITH A FIXED FRAME AND A ROTATABLE FRAME, filed on Aug. 29, 2017.

This application is a continuation in part of U.S. patent application Ser. No. 15/449,613, entitled COMPOSITE WEARABLE ELECTRONIC COMMUNICATION DEVICE, filed on Mar. 3, 2017, which is a continuation of U.S. patent application Ser. No. 14/541,873 (now U.S. Pat. No. 9,612,440), entitled COMPOSITE WEARABLE ELECTRONIC COMMUNICATION DEVICE, filed on Nov. 14, 2014.

BACKGROUND OF THE INVENTION

Field of the Invention

The present invention relates to telecommunication devices, and more particularly, to a wearable mobile electronic device.

Background of the Related Art

Wearable electronic devices have recently become more popular. In particular, this relates to spectacles combined with one or two displays located in front of a user's eyes. Despite predictions of an optimistic future for such devices, they have certain limitations due to large size of the hardware providing display operation. When such hardware is entirely positioned on a spectacles frame, it is not possible to provide enough capacity to its power source, especially when two displays are used. Even if only one display is used, the spectacles frame is still heavy and inconvenient when wearing it; in addition, it changes appearance of the user. When such hardware is positioned beyond the spectacles frame, a wire connecting two parts of the electronic device must be provided.

Different wearable devices available on the market or described in patent literature have one common attribute—they comprise two parts, a first part wearable on different parts of user body when the first part located on the user's head contains, for example, a spectacles frame with display and/or headphones, and a second part located on the user neck and shoulders that contains the hardware base for the first part, and both parts are interconnected by signal and power flexible joint/wires.

Any connection like those mentioned above includes movable and fixed parts (movable or fixed in relation to other parts of the device or in relation to a human body part on which they are located).

Disposition of the equipment on the user's neck and shoulders provides a far broader range of hardware and power batteries for providing longer and better operation of the display. Additionally, it allows placing two displays (a separate display in front of each eye), thus providing stereoscopic effect corresponding to the binocular nature of human vision, and reducing a risk of strabismus development being of concern in the case when a display for only one eye is used.

U.S. Pat. No. 7,377,636 B2 describes eyeglasses with a liftable frame, where the frame is configured to go up and down due to toothed joints between ends of the temples and the frame. Rotation of the liftable frame relative to its longitudinal axis is not provided, so the upper edge of the liftable frame touches the user's forehead upon lifting the frame, and the lenses can be contaminated.

U.S. Pat. No. 7,438,410 B1 describes an eyewear system including an eyeglass frame, a base device and a cord, where, when the eyewear system is worn by the user, the base device is positioned proximate to the neck or upper back region of the user, and the cord provides electrical connection between the base device and the frame. The eyewear system does not have movable frame and cannot change the angle of positioning in front of the user's eyes, and it has no option to temporary move the lens from the user's field of view without removing the whole device from the head.

Thus, no eyeglasses suitable for continuous wear are available, where the eyeglasses would be comfortably used in several positions, when optical members are disposed in front of the user's eyes (in a first operational position), or somewhat below the user's eyes (in a second operational position), or removed from the user's eyes (in a non-operational position), while the optical members do not touch the skin or hair of the user's head and maintain a normal appearance of the user.

SUMMARY OF THE INVENTION

The present invention describes that the hardware base for the display mounted on the spectacles frame in front of user's eyes is disposed on a device provided in the form of a neck band or a loop wearable on the user's neck, shoulders and chest. The chest-wearable part of the device can be disposed under cloths but the device still can be controlled through the cloths without visual contact with the keys located on the neck loop. Upon removing the spectacles frame with the display mounted thereon from the user's head, the spectacles frame may be disconnected from the chest-wearable part of the device, so the latter may be used as a chest set having headphones to be connected to a mobile phone, or alternatively the chest-wearable part of the device itself may be a mobile phone (or a smart phone), since the possibility of talking via microphones located on the neck loop and the possibility of listening via the headphones are still provided in this solution.

The object of the invention is providing a wearable electronic communication device comprising two parts, wherein one part is fixed on the user's head while wearing the device, and the other part is disposed on the user's neck, shoulders and chest.

As long as a major part of the hardware base needed for near-eye display operation is located on the user's chest, this makes it possible to lighten the AVR glasses frame and thus make near-eye displays sliding. This could be implemented on double-framed spectacles, where one frame with nose abutment is fixed and the other one is a movable frame containing displays that can be slid upwards. Such a construction would allow users to wear such AVR glasses constantly and not have to remove them from head when not in use, all without obstructing the view. The user would just need to lower displays in one move to activate AVR glasses that are always ready for use. Such a construction of AVR glasses allows manufacturers to use semi-transparent or even non transparent displays.

The moving frame is implemented based on multi-link lever mechanism with joints and levers geometry designed to avoid contacting forehead skin when displays are moved up. The movable frame with near-eye displays follows a complex trajectory skirting brow arches and the user's forehead, while in the upper position it places displays almost parallel to the forehead surface at a distance to eliminate pollution by skin while leaving an unobstructed view for the user.

The present invention could be used for all kinds of augmented and virtual reality (AVR) glasses—for street navigation and Internet surfing, texting, gaming or watching movies. Smart glasses and near-eye displays can be constructed in a manner to allow user partial visibility above, below or to the side of displays. This can allow, for example, typing texts in any circumstances having the text on displays always in front of your sight while looking down at the keyboard.

An object of this invention is achieved by rotary smart glasses including a neck band with a first electrical connector, at least one flexible adapter comprising two wires, a spectacles comprising: a second electrical connector, a fixed frame having left and right lateral ends, a nose abutment connected to the fixed frame at substantially equal distance from the lateral ends, a movable frame having left and right lateral ends and including two near-eye displays, left and right arms each having a distal end and a proximal end; where one of the wires of the flexible adapter is connected to the first electrical connector, and the other end of this wire is connected to the second electrical connector. Two wires of the flexible adapter are connected to the neck band such that points of connection of the two wires to the neck band are disposed in close proximity to each other and form a neck wire node and the two wires are mechanically connected to the spectacles forming at least one head wire node. The proximal ends of the left and right arms are articulated to the left and right lateral ends of the fixed frame, respectively, and the distal ends of the left and right arms are articulated to the left and right lateral ends of the movable frame, respectively, so that the articulated joints provide rotation of the left and right arms substantially in parasagittal planes.

Preferably, in some embodiments, the points of the articulated joints between the arms and the lateral ends of the fixed frame are positioned at a vertical distance not greater than 20 mm from the horizontal eye axis.

Preferably, in some embodiments, the points of the articulated joints between the arms and the lateral ends of the fixed frame are positioned above the horizontal eye axis.

Preferably, the smart glasses further comprise means for locking the movable frame in any position among multiple available positions.

Preferably, in some embodiments, the movable frame is adjustable based on a distance between the pupils.

Preferably, in some embodiments, the fixed frame further comprises optical members in front of the user's eyes.

Preferably, the smart glasses further comprise right and left bows connected to the left and right lateral ends of the fixed frame, respectively.

Preferably, in some embodiments, the smart glasses further include a cord connected to the bows or to the left and right lateral ends of the fixed frame.

Preferably, the flexible adapter includes an electrical connector for disconnecting the neck band from the spectacle.

Preferably, in some embodiments, the neck band is a loop.

Preferably, the smart glasses further include electronic units, power supply unit, buttons and/or keys, a photo camera and/or a video camera.

The object of the invention is further accomplished in a rotary smart glasses including a neck band with a first electrical connector, at least one flexible adapter comprising two wires, a spectacles comprising a second electrical connector, a fixed frame having left and right lateral ends, a nose abutment connected to the fixed frame at substantially equal distance from the lateral ends, a movable frame having left and right lateral ends and comprising two near-eye displays, upper left arm, lower left arm, upper right arm, and lower right arm, each having a distal and a proximal end, where one of the wires is connected to the first electrical connector, and the other end of this wire is connected to the second electrical connector.

The two wires of the flexible adapter are connected to the neck band, such that points of connection of the two wires to the neck band are in close proximity to each other and form a neck wire node and the two wires are mechanically connected to the spectacles, forming a head wire node.

The proximal ends of the upper and lower left arms and the upper and lower right arms are articulated to the left and right lateral ends of the fixed frame, respectively, and the distal ends of the upper and lower left arms and the upper and lower right arms are articulated to the left and right lateral ends of the movable frame, respectively, so that the upper and lower left arms and the upper and lower right arms and corresponding portions of the right and left lateral ends of the movable frame between the articulated joints and corresponding portions of the right and left lateral ends of the fixed frame between the articulated joints form four-link lever mechanisms substantially located in parasagittal planes.

It is recommended to locate the points of the articulated joints between the arms and the lateral ends of the movable frame at the left and right sides at a distance not greater than 20 mm.

Preferably, a distance between the articulated joints of the upper and lower arms on each end of the movable frame are greater than a distance between the articulated joints of the upper and lower arms on each end of the fixed frame.

The smart glasses may further comprise means for locking the movable frame, right and left bows, electronic units, power supply units, buttons and/or keys on the neck band, a photo camera and/or a video camera.

Preferably, in some embodiments, the smart glasses further comprise a cord connected to the bows or the left and right lateral ends of the fixed frame.

The movable frame may be adjustable based on a distance between the pupils.

The fixed frame may further comprise optical members in front of the user's eyes.

The flexible adapter may comprise an electrical connector for disconnecting the neck band from the spectacles.

When the movable frame is in an upper position, the optical members should be disposed in parallel with the user's forehead, and never protrude far from the head surface. At the same time, the optical members should not touch the forehead skin so as to avoid contamination of the optical members.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification and together with the description serve to explain the principles of the invention.

DETAILED DESCRIPTION OF THE PREFERRED EMBODIMENTS

Figure 1:
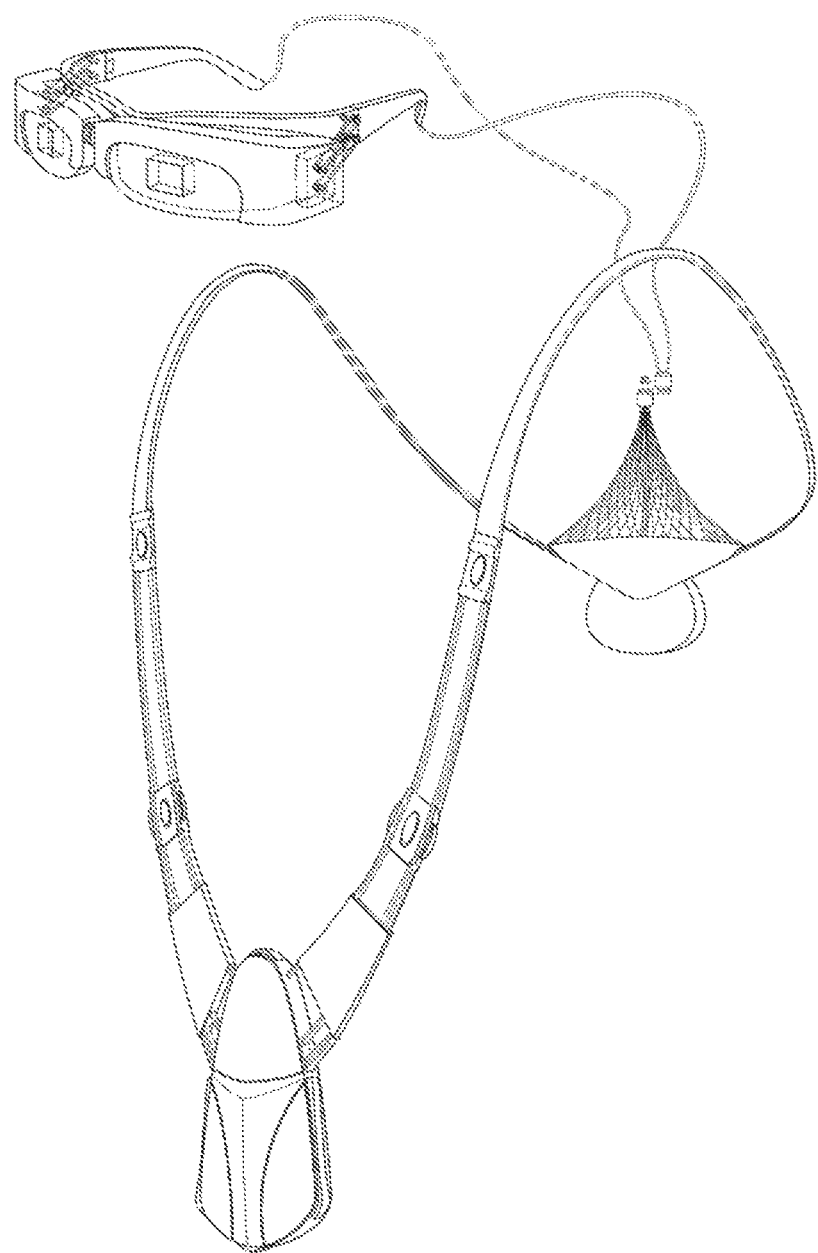
FIG. 1 shows a general view of rotary smart glasses having four arms, according to an embodiment of the invention.

Reference will now be made in detail to the preferred embodiments of the present invention, examples of which are illustrated in the accompanying drawings.

The images in the drawings are in schematic form, therefore they show only those parts of the invention, which are important for implementation of the invention by a person of ordinary skill in the art, and the less important parts or components are not shown in the drawings.

Expressions denoting orientation or direction like upward, downward, forward, backward, left, right shall be understood relative to head of a human in a vertical position, when eyes are in their natural position, eyesight is directed straight at an object located at eye level, the head is oriented straight forward with no tilt or rotation, unless the context explicitly indicates otherwise.

The following ophthalmology expressions are used for denoting position of the eyes, which may be different from commonly used terminology:
- an anatomic (sagittal) eye axis is a line connecting its poles;
- an eye rotation center is a point located in immediate vicinity of the middle of a sagittal axis segment located between the eye poles;
- a vertical axis is a line passing through the eye rotation center in perpendicular to the sagittal axis;
- a horizontal transversal axis is a line perpendicular to the vertical axis and the sagittal axis.

Figure 2:
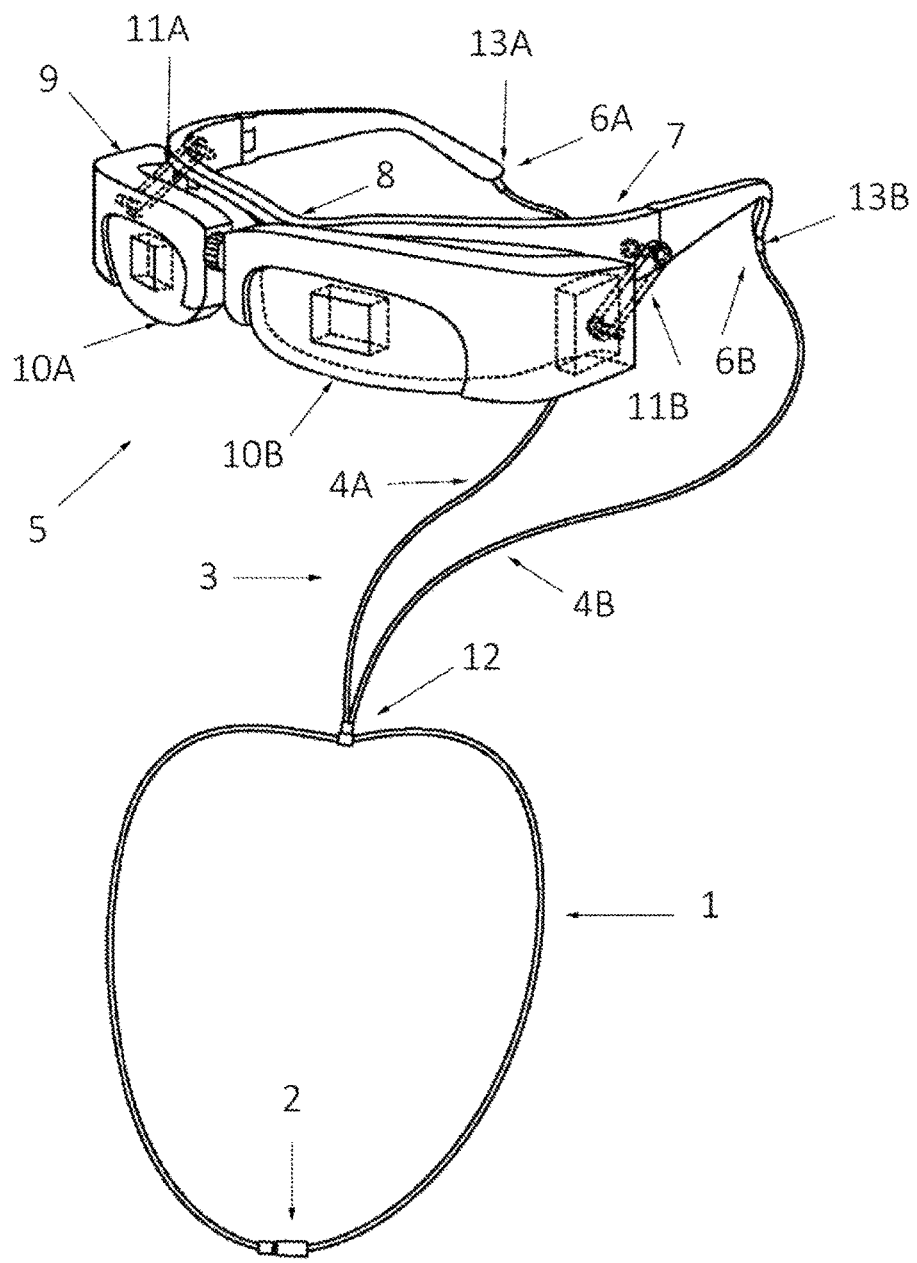
FIG. 2 shows a general view of rotary smart glasses having two arms, according to an embodiment of the invention.

Rotary smart glasses of one embodiment of the invention (see FIG. 2) comprise a neck band 1 with a first electrical connector 2, a flexible adapter 3 comprising two wires 4A, 4B, and spectacles 5. The spectacles includes a second electrical connector 6, a fixed frame 7 having left and right lateral ends, a nose abutment 8 connected to the fixed frame 7 at substantially equal distance from the lateral ends. The spectacles also include a movable frame 9 having left and right lateral ends and comprising two near-eye displays 10A, 10B, left 11A and right 11B arms each having a distal end and a proximal end.

One of the wires of the flexible adapter 3 is connected to the first electrical connector 2, and the other end of this wire is connected to the second electrical connector 6, where the two wires 4 of the flexible adapter are connected to the neck band 1, such that points of connection of the two wires to the neck band are in close proximity to each other and form a neck wire node 12, and the two wires are mechanically connected to the spectacles 5 forming head wire nodes 13A, 13B. The proximal ends of the left and right arms 11A, 11B are articulated to the left and right lateral ends of the fixed frame 7, respectively, and the distal ends of the left and right arms are articulated to the left and right lateral ends of the movable frame 9, respectively, so that the articulated joints provide rotation of the left and right arms substantially in parasagittal planes.

Figure 3:
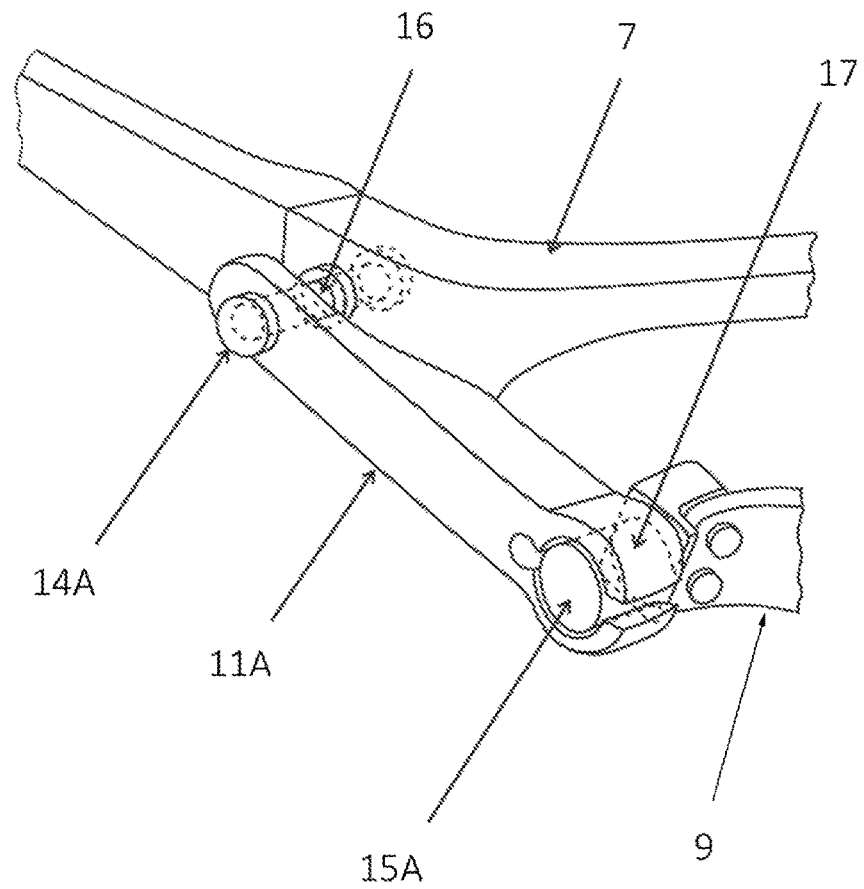
FIG. 3 shows an embodiment of a lever mechanism having two arms, according to an embodiment of the invention.

FIG. 3 shows detailed configuration of a joint of the movable frame 9 and the fixed frame 7 provided by the arm 11A in an embodiment, where the hinges 14A, 15A provides movement of the movable frame 9 relative to the fixed frame 7 via pins 16 and 17.

Figure 4:
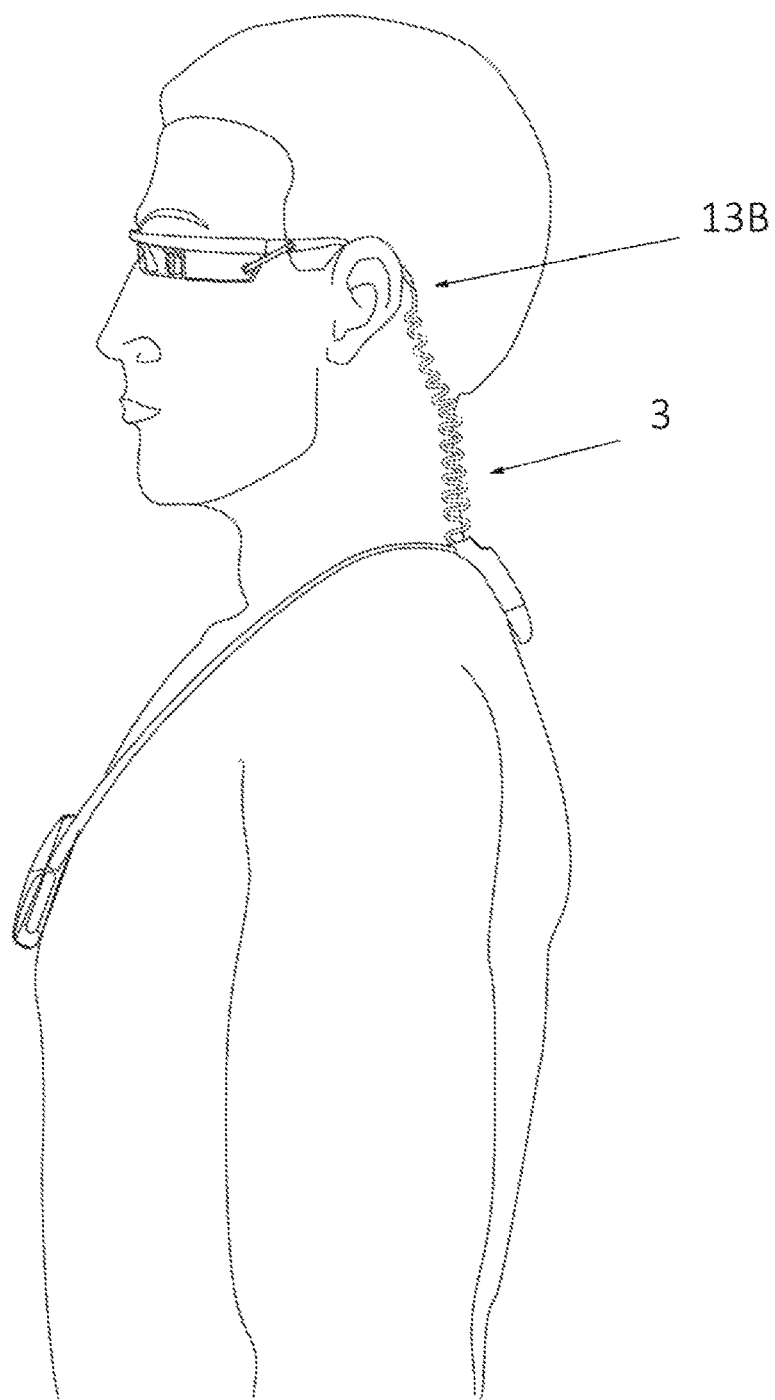
FIG. 4 shows an embodiment of rotary smart glasses according to an embodiment of the invention in an operational position on a user.

FIG. 4 shows rotary smart glasses according to an embodiment of the invention in an operational position on a user. The two wires are made in the form of a single cable, and the smart glasses comprise one head wire node.

Figure 5:
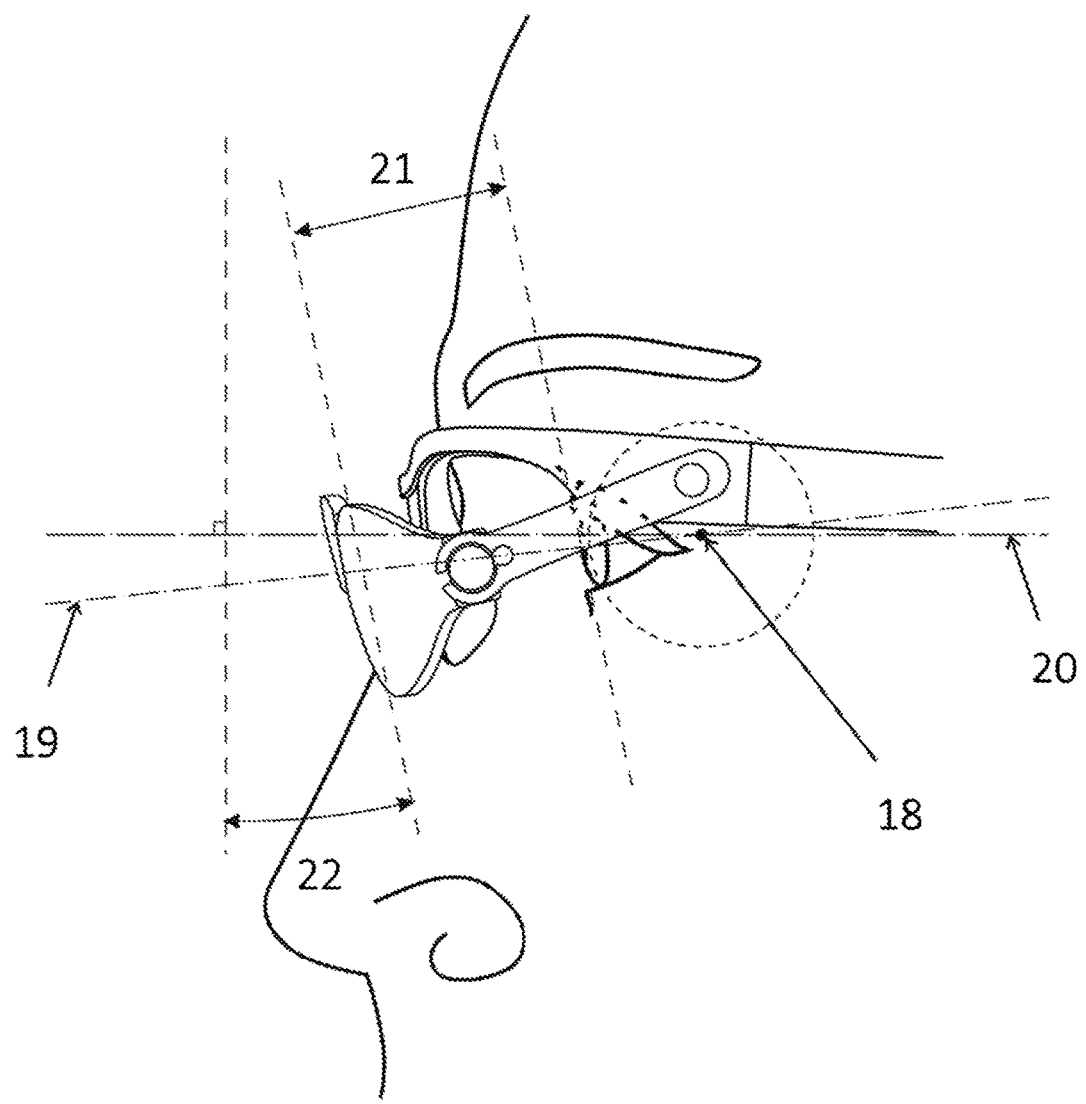
FIG. 5 shows main parameters used for designing the smart glasses.

FIG. 5 shows rotary smart glasses according to an embodiment of the invention in a lower operational position on a user and the following main details used for designing the glasses: an eye rotation center 18, an eyesight axis 19, a sagittal axis 20, a vertex distance 21 (i.e., a distance between the eyeball vertex and the inner (i.e., facing the eye) surface of a lens), and a pantoscopic angle 22.

If a two-arm rotation mechanism is used for rotating the movable frame, where each arm is connected to each frame by a hinge and the hinges connect distal ends of the right and left arms to the lateral left and right sides of the movable frame, respectively, the pantoscopic angle may be adjusted according to anatomic features and preferences of a user. When the movable frame is lifted up, the hinge allows placing the optical elements in parallel to the forehead surface at a sufficient distance from the forehead, so that the inner surfaces of the optical elements do not contact the skin, and contamination of the optical elements may be avoided. It is ensured by a configuration, in which the movable frame is able to go up and down in a vertical plane and additionally can rotate about its longitudinal axis due to an articulated link connecting the movable frame to the fixed frame.

Certain conditions should be applied while selecting the spectacles frame. These conditions are as follows: a vertex distance should be in a range of 12 to 15 mm; a pantoscopic angle should be in a range of 8 to 12 degrees; a bend angle of the frame should be in a range of 4 to 5 degrees. In practice, when a spectacles frame is selected, the pantoscopic angle is mostly assumed to be an angle between the optical axis of a lens and the eyesight axis in a neutral position of an eye (i.e., when eyesight is directed horizontally forward). If an eye is downcast, the angle between the optical axis of a lens and a horizontal line, when the eye is in a neutral position (i.e., when eyesight is directed horizontally forward), should be increased in order to maintain the angle between the optical axis of the lens and the eyesight axis of the eye unchanged. Calculations show that this angle should be in a range of 15 to 25 degrees i.e., somewhat greater than the standard value of 8 to 12 degrees used for any types of eyeglasses, in which the eyesight axis of an eye is supposed to be near horizontal. Near-eye display comprises an optical element screen. All of the above conditions apply to the calculation of optical displays elements.

Three positions of the movable frame are available:
an uppermost position, when the near-eye displays are out of sight of the user;
a middle position, when the near-eye displays are in front of eyes of the user and the eyesight axis of the eye is near horizontal;
a lowermost position.

The following initial data was used for modeling the lifting mechanism. It is necessary to maintain the vertex distance in an operation position of optical elements; the pantoscopic angle and anatomic features of the user's head also have to be taken into account. When smart glasses are worn with the movable frame in its lowest position (when the movable frame is positioned lower the fixed frame), the pantoscopic angle should not exceed 27 degrees relative to the sagittal eye axis in the natural position of the eye, and 12 degrees relative to the sagittal eye axis, when the eye is downcast for about 15 degrees, in comparison to the natural position. If you intend to use smart glasses in all three positions, it is recommended to limit maximum height of the displays to 20 mm.

When in a non-operational position, the near-eye displays should be located out of the user's field of vision and positioned in parallel to the user's forehead surface at a certain distance from the forehead skin so as to avoid contamination of the optical elements.

Figure 6:
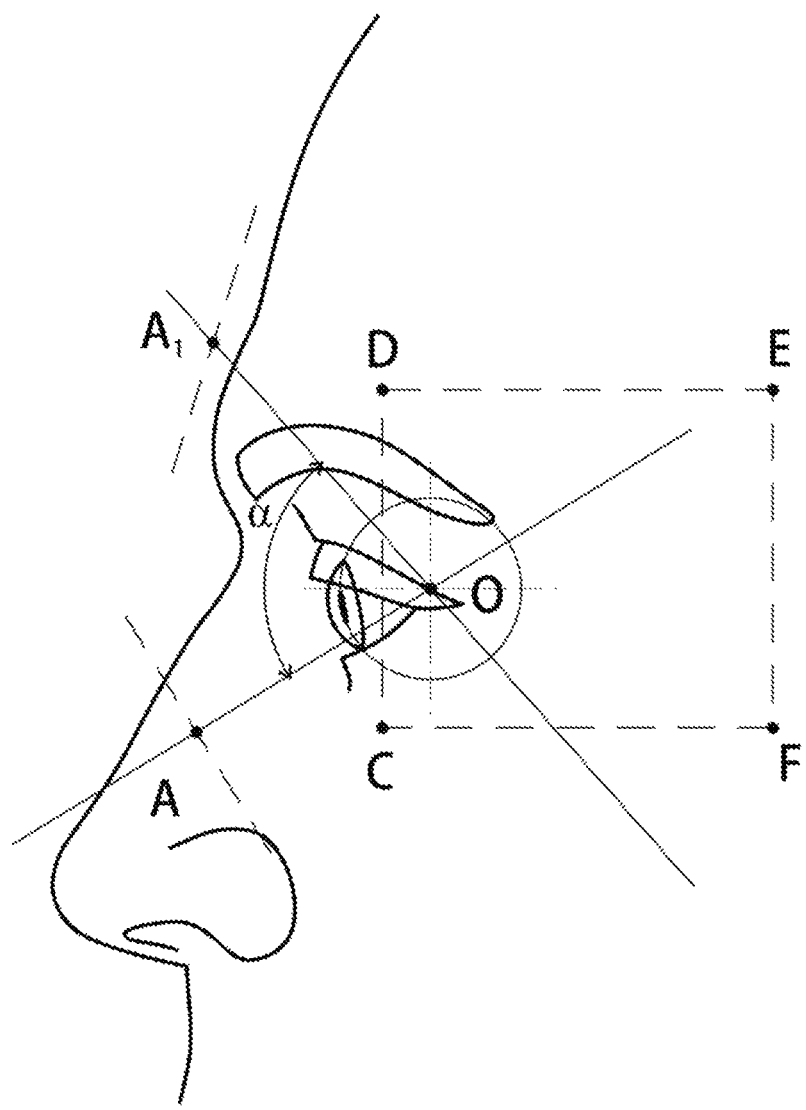
FIG. 6 shows a profile view of a model of the user's head with the sagittal cross-section of the eye.

FIG. 6 shows a profile view of a model of the user's head with the sagittal cross-section of the eye.

A two-dimensional solution needs to be found, where all elements of the smart glasses mechanism are projected to a plane corresponding to the sagittal cross-section passing through the rotation center of the eye. A cross point of the eyesight axis and the inner surface of the lens moves in this plane, when the eye moves up and down. The rotation center of the eye is defined as the reference point of design. Suppose axis X is directed along the anatomic (sagittal) axis of the eye, and axis Y is directed along the vertical axis of the eye. Dashed lines passing through points A and $A_1$ denote the inner surface of the lens in its sagittal cross-section passing through the rotation center.

When designing smart glasses having foldable bows, it is expedient to avoid placing points of connection of proximal hinges of the arms on the foldable bows. Upon analyzing a sample set of anatomical dimensions of user heads and traditional design of eyeglasses, it was found that possible connection points of the proximal hinges of the arms are located in area CDEF shown in FIG. 6. If certain conditions are met (conditions regarding the vertex distance, the pantoscopic angle and the lens height), axes of the proximal hinges shall be placed in an area having coordinate X in a range of −6 mm to +45 mm, and coordinate Y in a range of −20 mm to +26 mm.

Suppose uplifting the optical elements in vertical plane according a horizontal axis may be considered as rotation of the optical elements about point O, with distance OA being less than distance $OA_1$. Coordinates of a point where the point O shall move so as to satisfy the condition of $|OA|=|OA_1|$ have to be calculated, where the new coordinates of the point O are located in area CDEF.

First, a one-arm lifting mechanism shall be modeled, wherein one hinge is fastened to the movable frame edge, and another hinge is fastened to the fixed frame, taking into account the above-stated design conditions. It is tentatively assumed that the optical elements and the movable frame are flat in the frontal plane.

A condition of maintaining the arm length while moving from point A to point $A_1$ (i.e., rotation about point O, (see FIG. 6) is applied:

$$\sqrt{(x_0-x_{A1})^2-(y_0-y_{A1})^2}=\sqrt{(x_0-x_A)^2-(y_0-y_A)^2} \quad (1),$$

where
$x_0,y_0$ are coordinates of point O
$x_A,y_A$ are coordinates of initial point A
$x_{A1},y_{A1}$ are coordinates of final point A (i.e., $A_1$); therefore $$(x_0-x_{A1})^2-(y_0-y_{A1})^2=(x_0-x_A)^2-(y_0-y_A)^2 \quad (2)$$

$$x_0^2-2x_0x_{A1}+x_{A1}^2+y_0^2-2y_0y_{A1}+y_{A1}^2=x_0^2-2x_0x_A+x_A^2+y_0^2-2y_0y_A+y_A^2 \quad (3)$$

$$-2x_0x_{A1}+x_{A1}^2+y_{A1}^2+2x_0x_A-x_A^2-y_A^2=2y_0(y_{A1}-y_A) \quad (4)$$

$$y_O = \frac{x_O(x_A - x_{A1}) + (x_{A1}^2 - x_A^2)}{y_{A1} - y_A} + \frac{y_{A1} + y_A}{2} \quad (5)$$

Thus, equation (5) of a line is found, wherein the first term is the tangent of an inclination angle, and the second term is responsible for a shift relative to the reference point. Placing the connection point of the arm on a segment of the line within area CDEF resolves the above conditions. More precise selection of the connection point may be done based on exact configuration of the smart glasses, depending on the optical elements' height and the place of securing the lifting arms to the movable frame.

Figure 7:
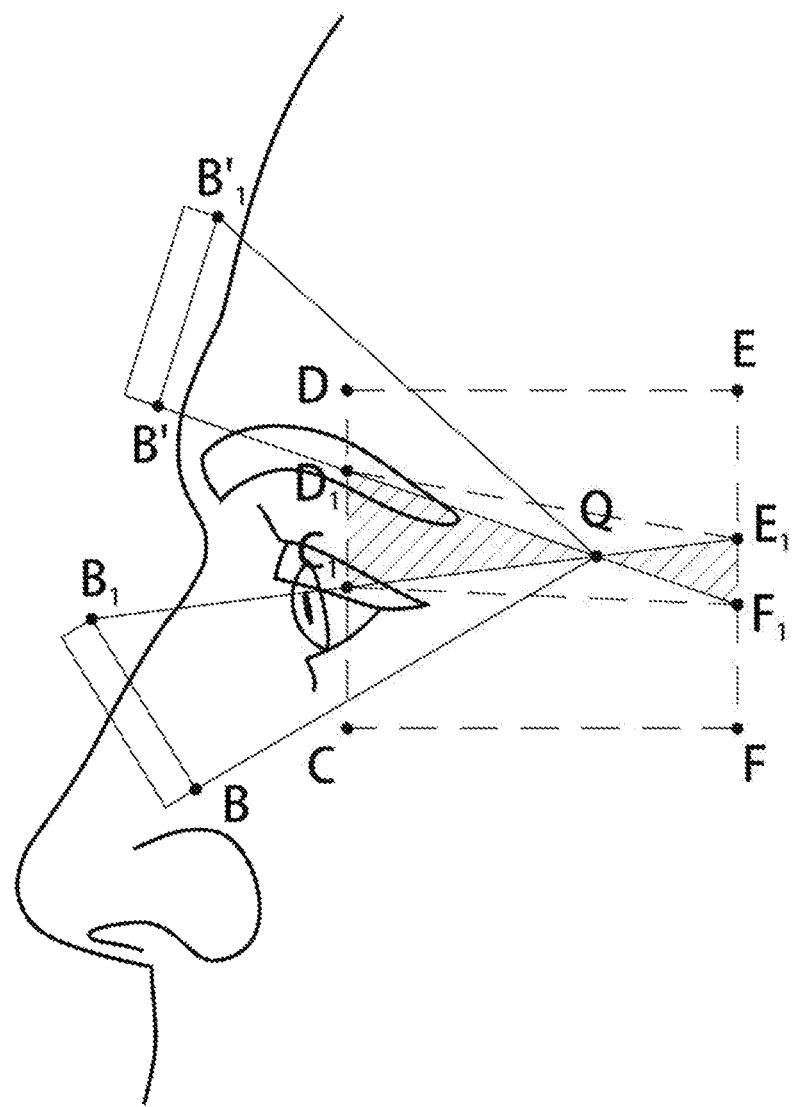
FIGS. 7 and 8 show two utmost positions of an optical element on a model of the user's head.

In this case suppose that the optimal height of the optical elements $BB_1$ is not greater than 25 mm, and the lifting angle of the optical elements is not greater than 85 degrees (FIG. 7). All possible places of points of securing the arms to the movable frame (points A) are located on segment $BB_1$.

By using the defined substitutional values and solving equation (5), area CDEF (projection of securing the arm pin to the fixed frame) may be reduced to area $C_1D_1QE_1F_1$, which further may be optimized to area $C_1D_1Q$, wherein point Q is a projection of the fixed frame hinge on the sagittal plane opposite to a temporal region near the frontal bone zygomatic process.

Further, optimization of calculation of the one-arm lifting mechanism model will be considered.

Figure 8:
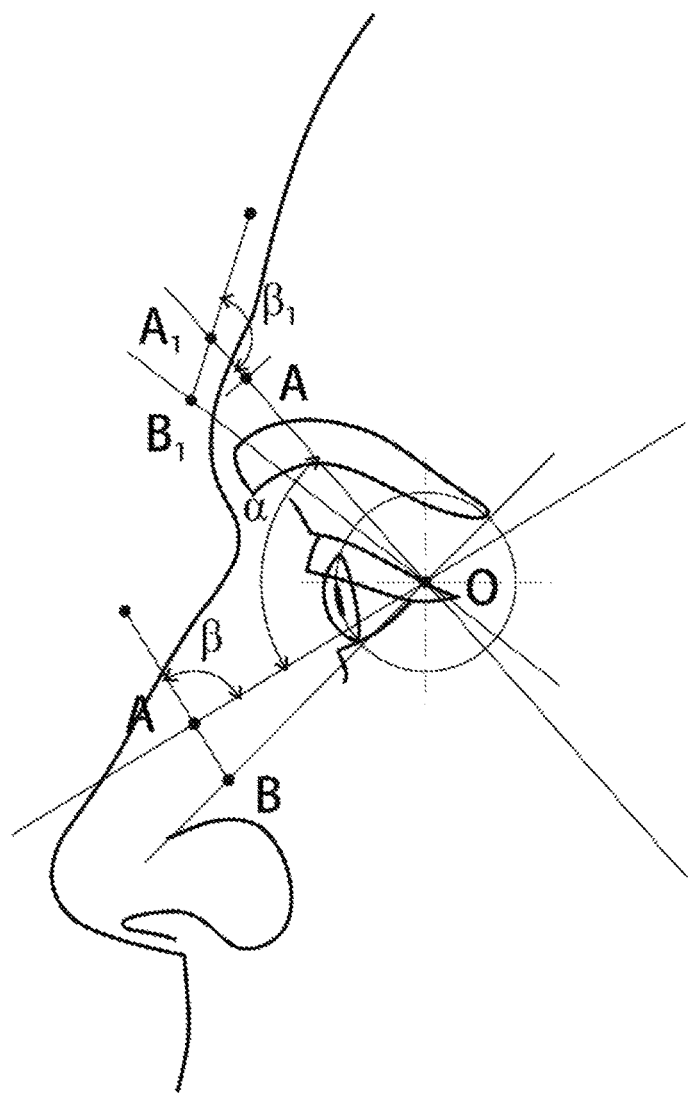

Two ultimate positions of the near-eye display are already defined (see FIGS. 7, 8). Transition of the displays from its initial position to its final position may be considered as a superposition of the following movements:

first, rotation of point A around point O; but in this case point A would penetrate into the forehead, so in order to avoid this, it is necessary to increase the length of OA to the length of $OA_1$ or change the position of point O; therefore second, the length of OA has to be changed, i.e., point A should be shifted to $A_1$.

Optimal optical elements height is 25 mm, and this means that the movable frame has to be rotated about its longitudinal axis passing through the hinge securing the arm to the movable frame, which corresponds to change angle $\beta$ to angle $\beta_1$ in the model; and third, the optical elements thus rotates about the new position of point A (i.e., about point $A_1$).

The simplest way of representing these operations is defining coordinates of a point in a form of a two-dimensional vector and multiplying this vector by a corresponding matrix for each operation (e.g., rotation or shift), thus obtaining a new vector (i.e., new coordinates of the point) (see FIG. 8).

A matrix corresponding to clockwise rotation by angle $\alpha$ is as follows:

$$M(\alpha) = \begin{matrix} \cos\alpha & \sin\alpha \\ -\sin\alpha & \cos\alpha \end{matrix} \quad (6)$$

Coordinates of point $A_1$ may be found:

$$\begin{pmatrix} x_{A1} \\ y_{A1} \end{pmatrix} = \begin{pmatrix} \cos\alpha & \sin\alpha \\ -\sin\alpha & \cos\alpha \end{pmatrix} \cdot \begin{pmatrix} x_A \\ y_A \end{pmatrix} \quad (7)$$

The following equations may be obtained by multiplying the matrix:

$$x_{A1} = x_A \cdot \cos\alpha + y_A \cdot \sin\alpha \quad (8)$$

$$y_{A1} = x_A \cdot \sin\alpha + y_A \cdot \cos\alpha \quad (9)$$

Figure 9:
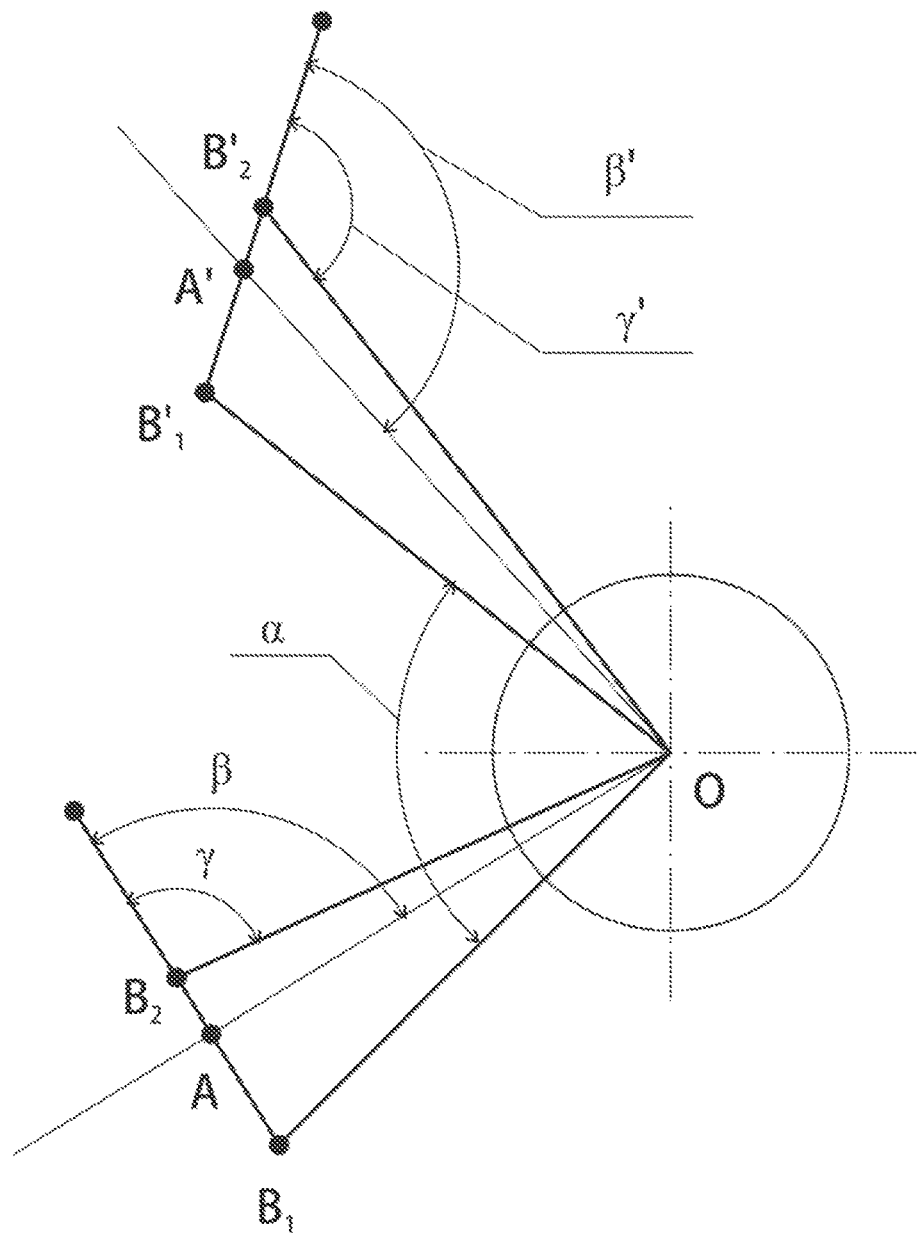
FIG. 9 illustrates a mathematical model for calculating an optical elements rotation angle, according to an embodiment of the invention.

Rotation around an arbitrary point corresponds to rotation around the reference point as shown in expressions (6) to (9), but with coordinates of the rotation center point observed. For example, for rotation of point $A_1$ about point $B_1$ by an angle $\beta$ (see FIG. 9) the following results:

$$x_{A3} = x_{B2} + (x_{A2} - x_{B2}) \cdot \cos\beta + (y_{A2} - y_{B2}) \cdot \sin\beta \quad (10)$$

$$y_{A3} = y_{B2} - (x_{A2} - x_{B2}) \cdot \sin\beta + (y_{A2} - y_{B2}) \cdot \cos\beta \quad (11)$$

where $x_A$, $y_A$ are coordinates of an initial point (point A), $x_{A1}$, $y_{A1}$ are coordinates of a new position of point A after the first movement (i.e., point $A_1$), $x_{A2}$, $y_{A2}$ are coordinates of a new position of point A after the second movement (i.e., point $A_2$), $x_{A3}$, $y_{A3}$ are coordinates of a new position of point A after the third movement (i.e., point $A_3$).

According to the law of sines, the following expression may be found from triangle $OB_2'A'$:

$$\frac{OB_2'}{\sin\beta'} = \frac{OA'}{\sin(180° - \gamma')} \quad (12)$$

Given that $\sin(180-\gamma') = -\sin(\gamma')$, $\sin(-\gamma') = -\sin(\gamma')$, expression (12) produces the following result:

$$OA' = \frac{-OB_2' \cdot \sin\gamma'}{\sin\beta'} \quad (13)$$

If angle $\gamma$ itself has to be determined, then:

$$\gamma' = -\sin^{-1}\left(\frac{-OA' \cdot \sin\beta'}{OB_2'}\right) \quad (14)$$

Two different solutions may be used for providing rotation of the optical elements by angles $\beta$ and $\beta'$ relative to the arm. In a simpler embodiment, changing angle $\beta$ to angle $\beta'$ is provided by an additional hinge located in the point of connection between the arm and the movable frame, the hinge ensuring rotation of the movable frame around its longitudinal axis passing through the hinge center. However, with this solution, the user has to perform an additional movement for rotating the displays; moreover, some skewing between the movable frame and the arms may occur.

These disadvantages may be avoided in a more complex embodiment, where the rotation of the movable frame is provided not about its longitudinal axis passing through the hinge center, but via a path defined by hinges in the rotational mechanism based on two-beam articulated four-link lever mechanism (which sometimes may be a pantograph) ensuring required movement manner of the movable frame in two planes.

Analysis performed for a one-arm mechanism allows determining dimensions and coordinates of the ends of one beam.

Therefore, in order to design the four-link lever mechanism, a length of the other beam and location of its hinges have to be determined, taking into account constraints of the optical elements height (i.e., maximal coupler length) and the bar length (distance between the points of connection of the lever hinges to the fixed frame), which has to be within area CDEF and cannot exceed 20 mm.

Figure 10:
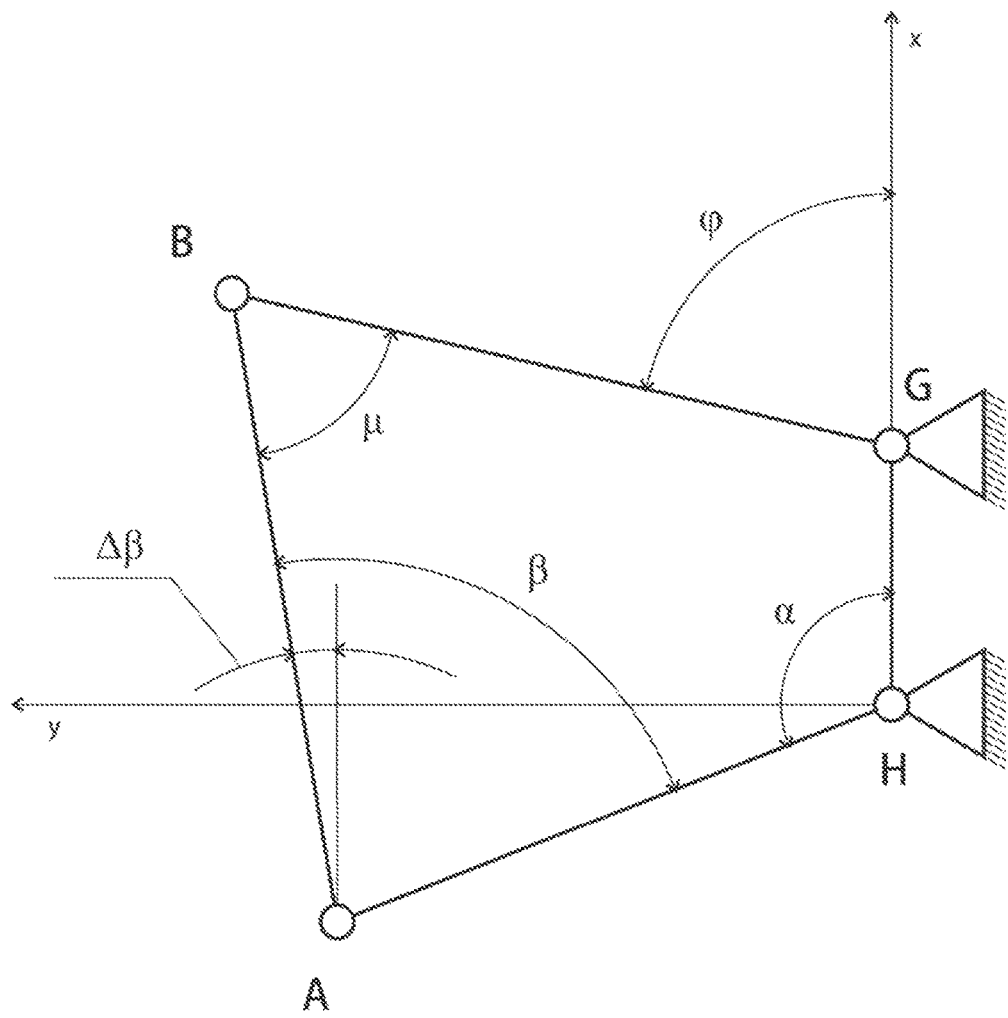
FIG. 10 illustrates a kinematical model for calculating a four-link lever mechanism, according to an embodiment of the invention.

Thus, in order to design the four-link lever mechanism (shown in FIG. 10) the following equations may be defined:

projecting segments of the links onto axis Y:

$$HA \cdot \sin\alpha - AB \cdot \sin\Delta\beta = BG \cdot \sin\varphi \quad (15)$$

$$AB \cdot \sin\Delta\beta = HA \cdot \sin\alpha - BG \cdot \sin\varphi \quad (16)$$

$$(AB\cos\Delta\beta)^2 = (HG + BG\cdot\cos\varphi - HA\cdot\cos\alpha)^2 = HG^2 + 2\cdot HG\cdot BG\cdot\cos\varphi - 2\cdot HG\cdot HA\cdot\cos\alpha + BG^2\cdot\cos^2\varphi - 2\cdot HA\cdot DG\cdot\cos\varphi\cdot\cos\alpha + HA^2\cdot\cos^2\alpha \quad (17)$$

projecting segments of the links onto axis X:

$$HA \cdot \sin\alpha - AB \cdot \sin\Delta\beta = BG \cdot \sin\varphi \quad (18)$$

$$AB \cdot \sin\Delta\beta = HA \cdot \sin\alpha - BG \cdot \sin\varphi \quad (19)$$

$$(AB\cdot\sin\Delta\beta)^2 = (HA\cdot\sin\alpha - BG\cdot\sin\varphi)^2 = HA^2\sin^2\alpha + BG^2\cdot\sin^2\varphi + 2\cdot HA\cdot BG\cdot\sin\alpha\cdot\sin\varphi \quad (20);$$

summing equations (17) and (20):

$$AB^2 = AH^2 + BG^2 + HG^2 + 2 \cdot HG \cdot BG \cdot \cos \varphi - 2 \cdot HG \cdot HA \cdot \cos \alpha - 2 \cdot HA \cdot BG \cdot \cos \varphi \cdot \cos \alpha - 2 \cdot HA \cdot BG \cdot \sin \alpha \cdot \sin \varphi \quad (21)$$

transforming expression (21) into this form:

$$\frac{HA^2 - AB^2 + BG^2 + HG^2}{2 \cdot HA \cdot BG} + \frac{HG}{HA} \cdot \cos\varphi - \frac{HG}{BG} \cdot \cos\alpha - \cos\alpha \cdot \cos\varphi - \sin\alpha \cdot \sin\varphi = 0 \quad (22)$$

defining terms of expression (22) in this way:

$$k_1 = \frac{HA^2 - AB^2 + BG^2 + HG^2}{2 \cdot HA \cdot BG}; k_2 = \frac{HG}{HA}; k_3 = \frac{HG}{BG} \quad (23)$$

and finally resulting in:

$$k_1 + k_2 \cdot \cos\varphi - k_3 \cdot \cos\alpha = -\cos(\alpha + \varphi) \quad (24)$$

The resulting equation contains three parameters $k_1$, $k_2$ and $k_3$, which are link lengths; accordingly, it is necessary to define three positions of the mechanism in order to compose and solve a corresponding equation set. Constraints have to be defined in order to avoid an infinite number of solutions. In this case, the constraints comprise an area, in which the hinges are disposed, extreme positions of the mechanism, and possible positions of the hinges relative to each other.

Equation (24) is a Friedenstein equation and $k_1$, $k_2$ and $k_3$ are Friedenstein factors. The equation allows solving the problem of designing a four-link lever mechanism, if some positions of a guide link and a follower link are known. For example, three predetermined positions of the guide link and the follower link allow defining the following angle parameters:

$\alpha_1$, $\alpha_2$, $\alpha_3$ are three positions of the guide link;
$\varphi_1$, $\varphi_2$, $\varphi_3$ are three positions of the follower link.
These initial data produce the following equation set:

$$\begin{cases} k_1 + k_2 \cdot \cos\varphi_1 - k_3 \cdot \cos\alpha_1 = -\cos(\varphi_1 + \alpha_1) \\ k_1 + k_2 \cdot \cos\varphi_2 - k_3 \cdot \cos\alpha_2 = -\cos(\varphi_2 + \alpha_2) \\ k_1 + k_2 \cdot \cos\varphi_3 - k_3 \cdot \cos\alpha_3 = -\cos(\varphi_3 + \alpha_3) \end{cases} \quad (25)$$

Equation set (25) may be represented in a matrix form like $A \times k = b$, wherein $$A = \begin{bmatrix} 1 & \cos\varphi_1 & -\cos\alpha_1 \\ 1 & \cos\varphi_2 & -\cos\alpha_2 \\ 1 & \cos\varphi_3 & -\cos\alpha_3 \end{bmatrix}; k = \begin{bmatrix} k_1 \\ k_2 \\ k_3 \end{bmatrix}; b = \begin{bmatrix} -\cos(\varphi_1 + \alpha_1) \\ -\cos(\varphi_2 + \alpha_2) \\ -\cos(\varphi_3 + \alpha_3) \end{bmatrix} \quad (26)$$

Finding solution to the equation set in a general form:

$$k = A^{-1} \cdot b \quad (27)$$

Further, based on the found Friedenstein factors, dimensions of the links in the four-link lever mechanism may be found:

$$HG = 1; HA = \frac{HG}{k_2}; \quad (28)$$

$$AB = \frac{\sqrt{k_2^2 + k_3^2 + k_2^2 \cdot k_3^2 - 2 \cdot k_1 \cdot k_2 \cdot k_3}}{k_2 \cdot k_3}; BG = \frac{HG}{k_3}$$

The dimensions are in millimeters, according to the base measurement units selected due the scale and estimate size of the mechanism under design.

Based on the above equations, an optimized lifting mechanism may be designed using an appropriate mathematical software tool like MathCAD or MatLab.

Figure 11:
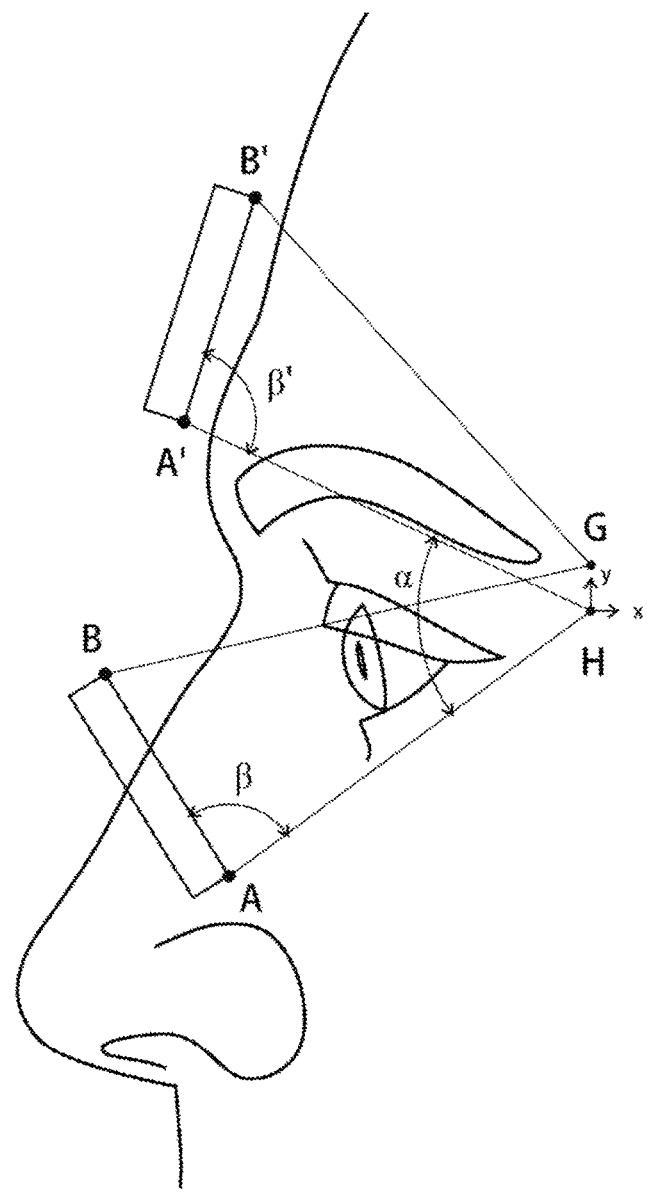
FIG. 11 shows an embodiment of a lever mechanism of rotary smart eyeglasses having four arms, according to an embodiment of the invention.

In view of the design problem (FIG. 11), length values of two elements (i.e., length of the follower link and the distance between the hinges) may be found based on length values of the other two elements (i.e., length of the guide link and length of the bar).

The above-stated analytical dependencies allow performing necessary calculations and developing a kinematic model of the design according to the following conditions:

distance between the eye pupil and the inner surface of the optical element is between 15 mm and 25 mm, and the eyesight axis of the eye is inclined downward by 15 degrees relative to a horizontal line, when the user's head in a straight position;

a range of rotation of the movable frame is 70 to 85 degrees;

an angle of rotation of the movable frame about its longitudinal axis is equal to $\Delta\beta$ upon lifting the movable frame.

Optimization of the design may be done by variation of the following values (taken in their projection to the sagittal plane):

length values of the beams (arms), while the hinges of the arms are secured to the fixed frame within area $C_1D_1E_1F_1$;

a distance between the distal hinges (i.e., the bar length), which is less than 20 mm;

an angle of rotation of the movable frame about its longitudinal axis ($\Delta\beta$), which is preferably in a range of 10 to 25 degrees.

Variation of the above values should be done while meeting the condition of securing proximal hinges of the arms to the fixed frame within area $C_1D_1E_1F_1$.

In view of basic ophthalmological parameters, the size of conventional eyeglasses having foldable bows, and the above-indicated expressions, optimizing calculation may be performed for elements of the four-link lifting mechanism.

Figure 12:
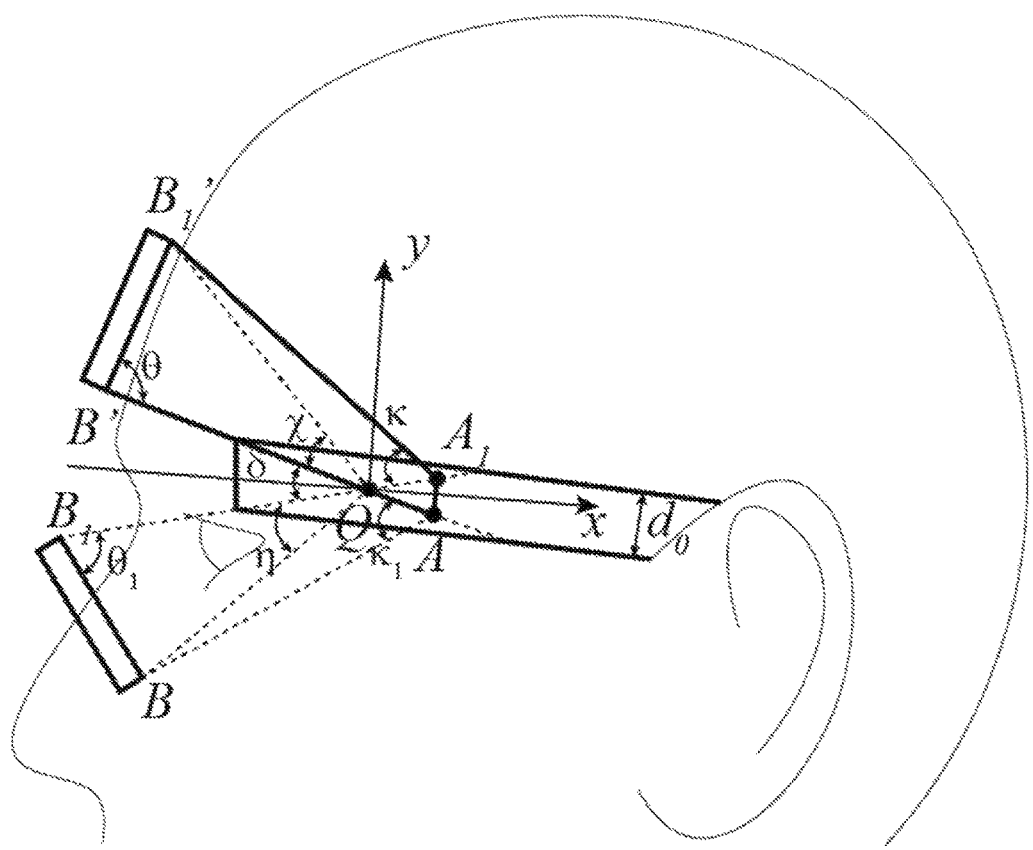
FIG. 12 illustrates a mathematical model for adjusting calculation of a four-link lever mechanism, according to an embodiment of the invention.

The Friedenstein method is further used for resolving four-link mechanism $AA_1B'B_1'$ (FIG. 12). Suppose that positions of the movable frame are already defined, i.e., length values $QB=q$, $QB'=q'$, $QB_1=q_1$, $QB_1'=q_1'$, as well as angles $\delta$, $\chi$, $\eta$ are known. Suppose also that axis X coincides with the bisectrix of angle $\delta$ and is disposed in perpendicular to segment $AA_1$, and axis Y is disposed in perpendicular to axis X. By projecting the four-link mechanism $AA_1B'B_1'$ onto the axes and using Friedenstein method, the following expressions may be found:

$$AB' \cos(\delta/2) = B_1'A_1 \cos(\kappa - \delta/2) + B'B_1' \cos(\theta - \delta/2) \quad (29)$$

$$AB' \sin(\delta/2) = B_1'A_1 \sin(\kappa - \delta/2) - B'B_1' \sin(\theta - \delta/2) + AA_1 \quad (30)$$

Suppose $AA_1 = a$, $BB_1 = B'B_1' = b$, where b is calculated as follows:

$$b = \sqrt{q_1'^2 - 2q'q_1'\cos\chi + q'^2} \quad (31)$$

By moving terms not containing K from right portions of equations (29) and (30) to left portions, and by raising both equations to the second power and summing up thereof, the following first Friedenstein-like equation may be obtained for the four-link mechanism in position $AA_1B'B_1'$:

$$2bAB' \cos\theta + 2aAB' \sin(\delta/2) + 2ab \sin(\theta-\delta/2) = b^2 + a^2 - AB'^2 + A_1B'_1{}^2 \quad (32)$$

In the same way, the following second Friedenstein-like equation may be obtained for the four-link mechanism in position $AA_1BB_1$:

$$2bA_1B_1 \cos\theta_1 + 2aA_1B_1 \sin(\delta/2) + 2ab \sin(\theta_1-\delta/2) = b^2 + a^2 - AB^2 + A_1B_1{}^2 \quad (33)$$

By matching angles $\theta$ and $\theta_1$ with values defining positions of link $BB_1$ in triangles $BB_1Q$ and $B'B_1'Q$, the following expressions are obtained:

$$\theta = \sin^{-1}\frac{b}{q_1' \sin\chi} \quad (34)$$

$$\theta_1 = \sin^{-1}\frac{b}{q \sin\eta} \quad (35)$$

By summing up expressions (32) and (33), the following expression are obtained:

$$A_1B_1 + AB = \frac{b^2 + a^2 - ab(\sin(\theta_1 - \delta/2) + \sin(\theta - \delta/2))}{b(\cos\theta + \cos\theta_1) + 2a\sin(\delta/2)} \quad (36)$$

Total length of the links (arms) may be expressed in a form of a function of the length of link $AA_1$, i.e., Si $(a) = A_1B_1 + AB$. Further, the optimization problem may be solved in the following two ways.

The first way is optimization of the arm length. By finding minimum of function $S_l(a)$, $$\text{when } \frac{dS_l}{da} = 0,$$

the following expression may be obtained:

$$\frac{dS_l}{da} = \frac{ea^2 + a(2d - ec) - cd - eb^2}{(d + ae)^2} = 0 \quad (37)$$

where $$e = 2\sin(\delta/2), \ c = b(\sin(\theta_1-\delta/2) + \sin(\theta-\delta/2)), \ d = b(\cos\theta + \cos\theta_1) \quad (38)$$

Further, an equation root corresponding to $S_{lmin}$ may be obtained:

$$a_0 = (ec - 2d + \sqrt{(2d-ec)^2 + 4e(cd+eb^2)})/2e \quad (39)$$

Therefore, $S_{lmin}$ value is:

$$S_{lmin} = \frac{b^2 + a_0^2 - ab(\sin(\theta_1 - \delta/2) + \sin(\theta - \delta/2))}{b(\cos\theta + \cos\theta_1) + 2a\sin(\delta/2)} \quad (40)$$

In the above approach, the optimization does not include minimization of the length of link $AA_1$, therefore, its length $a_0$ might exceed size $d_0$ of the spectacles bow considerably, which is undesirable. Thus, attention should be paid to selection of point Q, which defines angle $\delta$. In this case the angle value may be obtained from the following equation:

$$a_0(\delta) = a_d \quad (41)$$

where $a_d$ is maximal possible length of link $AA_1$ disposed on the bow. Further, the obtained angle value may be used in equation (40) and the $S_{lmin}$ value may be found.

After obtaining minimal total length of the links, the next link length may be found:

$$A_1B_1 = S_{lmin} - AB \quad (42)$$

By substitution in equation (33) and excluding $A_1B_1$ from it, the length of AB may also be found.

Based on initial data, it is found that optimal length of the arms (beams) for rotary eyeglasses is in a range of 20 mm to 60 mm, and the arm length depends on curvature of both fixed frame and movable frames. In other words, in designs where the movable frame has minimal curvature and the fixed frame has maximal curvature, the arm length is at a maximum; if the movable frame has maximal curvature of 8 units (i.e., when the so-called "frame curvature angle" is 25 to 35 degrees), the arm length is at a minimum, especially when curvature of the fixed frame is not large.

A second way is optimization of the distance between the upper and lower proximal hinges; calculation is done in a similar manner and produces the optimal value of 20 mm or less.

The multi-lever mechanism that allows lifting the rotatable frame bearing the near-eye displays and rotating the liftable frame about its longitudinal axis may be used in helmets (protective helmets or virtual reality helmets). The above-stated calculation methodology may be used for helmets also, with appropriate change in the initial data, according to the problem to be solved.

Lengths of the arms (beams) of the lifting mechanism may be less than those calculated based on projections to the sagittal plane. However, this fact does not change the design principle.

When using a four-link mechanism for lifting the movable frame, the hinges of the arms may be secured to the frame on opposite sides, so in some cases, even if the arms are crossed with the frame or with other arms in one projection, they would not interfere to each other, as they are disposed in different planes.

In order to observe predetermined conditions, namely, a vertex distance and a pantoscopic angle, and also to avoid skewing the movable frame during its lifting, the longitudinal axis of the fixed frame passing through centers of proximal hinges is preferably positioned parallel to the eye horizontal axis at a distance of 20 mm or less above the eye horizontal axis.

Rotation of the movable frame in a vertical plane is provided about the longitudinal axis of the fixed frame passing through centers of proximal hinges for securing the arms. Based on average statistical anthropometric data of a representative sample set including men and women over age 18, and taking into account usual shapes and sizes of conventional eyeglasses having foldable bows, the following conditions are preferable to be observed:

disposing proximal hinge for rotation of the movable frame so that the longitudinal axis of the fixed frame is positioned at a distance of 20 mm or less from the eye horizontal axis;

and disposing proximal hinges for rotation of the movable frame so that the longitudinal axis of the fixed frame is positioned above the eye horizontal axis.

In some embodiments, the rotary smart glasses may additionally include a cam mechanism for changing rotation angle of the movable frame about its longitudinal axis, depending on angle of lifting the arms; they also may include means for locking up the movable frame in its uppermost and/or lowermost position.

Figure 13:
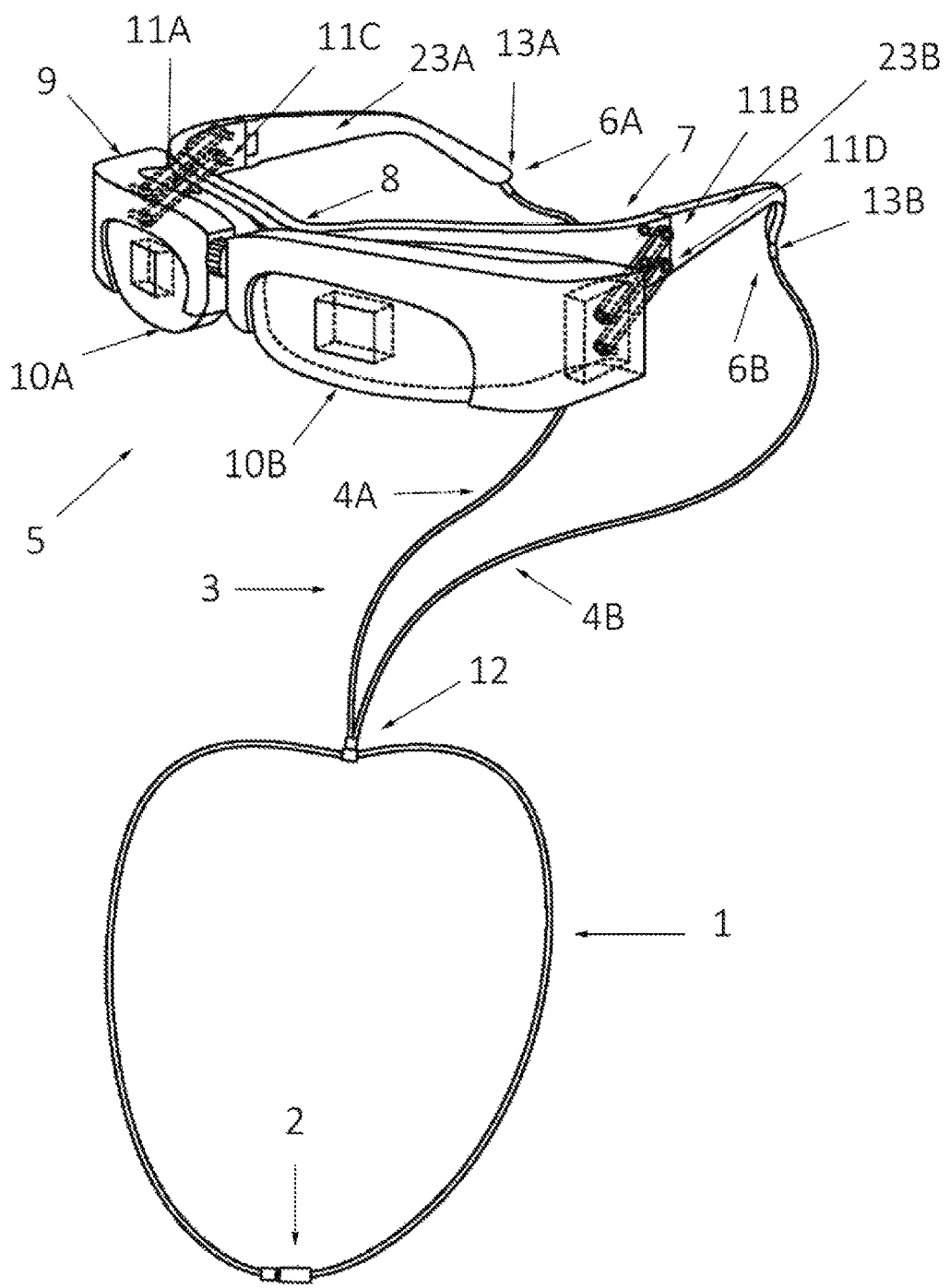
FIG. 13 shows preferred embodiments of rotary smart glasses having four arms, according to an embodiment of the invention.

In some embodiments (FIG. 13), rotary smart glasses include a neck band 1 with a first electrical connector 2, a spectacles 5 comprising a second electrical connector 6, a fixed frame 7 having left and right lateral ends, a nose abutment 8 connected to the fixed frame at substantially equal distance from the lateral ends, a movable frame 9 having left and right lateral ends and including two near-eye displays 10A, 10B, an upper left arm 11B, a lower left arm 11D, an upper right arm 11A, and a lower right arm 11C, each having a distal and a proximal end.

The rotary smart glasses also include a flexible adapter 3 including two wires 4A, 4B, where one of the wires is connected to the first electrical connector 2 and the other end of this wire is connected to the second electrical connector 6. The two wires of the flexible adapter are connected to the neck band 1 such that points of connection of the two wires to the neck band are disposed in close proximity to each other and form a neck wire node 12. The two wires are mechanically connected to the spectacles 6 forming head wire nodes 13A, 13B, where the proximal ends of the upper 11B and lower 11D left arms and the upper 11A and lower 11C right arms are articulated to the left and right lateral ends of the fixed frame 7, respectively, and the distal ends of the upper and lower left arms and the upper and lower right arms are articulated to the left and right lateral ends of the movable frame 9, respectively, so that the upper and lower left arms and the upper and lower right arms and corresponding portions of the right and left lateral ends of the movable frame between the articulated joints and corresponding portions of the right and left lateral ends of the fixed frame between the articulated joints form four-link lever mechanisms substantially located in parasagittal planes.

In some embodiments (FIG. 13), the fixed frame 7 includes right and left bows 23A, 23B connected to the left and right lateral ends of the fixed frame, respectively.

Figure 14:
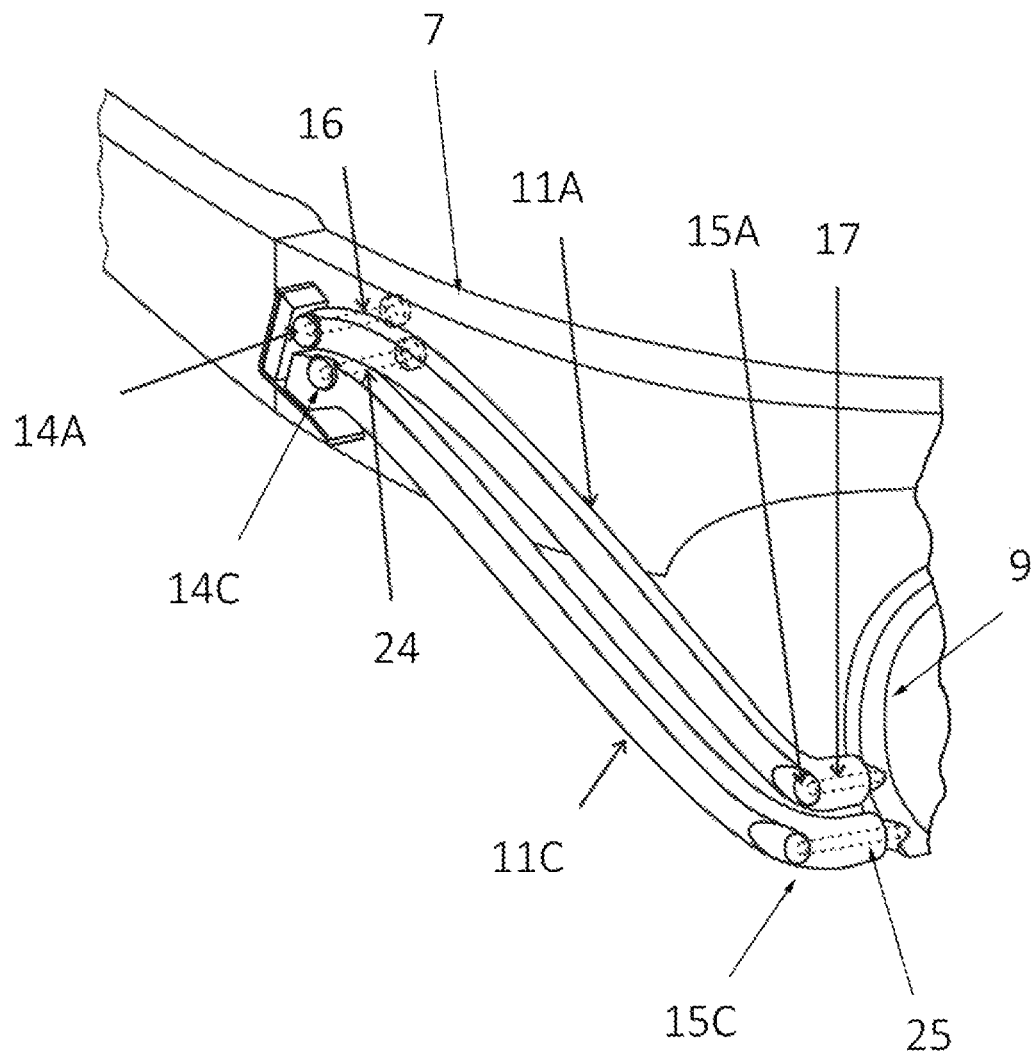
FIG. 14 shows an embodiment of a four-link lever mechanism, according to an embodiment of the invention.

FIG. 14 shows a detailed configuration of a joint of the movable frame 9 and the fixed frame 7 provided by four-link lever mechanisms. The four-link lever mechanism includes the upper 11A and lower 11C right arms, where the movability of the arms in the hinges 14A, 14C, 15A, 15C provides movement of the movable frame 9 relative to the fixed frame 7 via pins 16, 17, 24, 25.

In some embodiments the points of the articulated joints between the arms and the lateral ends of the movable frame at the left and right sides are located at a distance not greater than 20 mm A distance between the articulated joints of the upper and lower arms on each end of the movable frame is greater than a distance between the articulated joints of the upper and lower arms on each end of the fixed frame.

Figure 15:
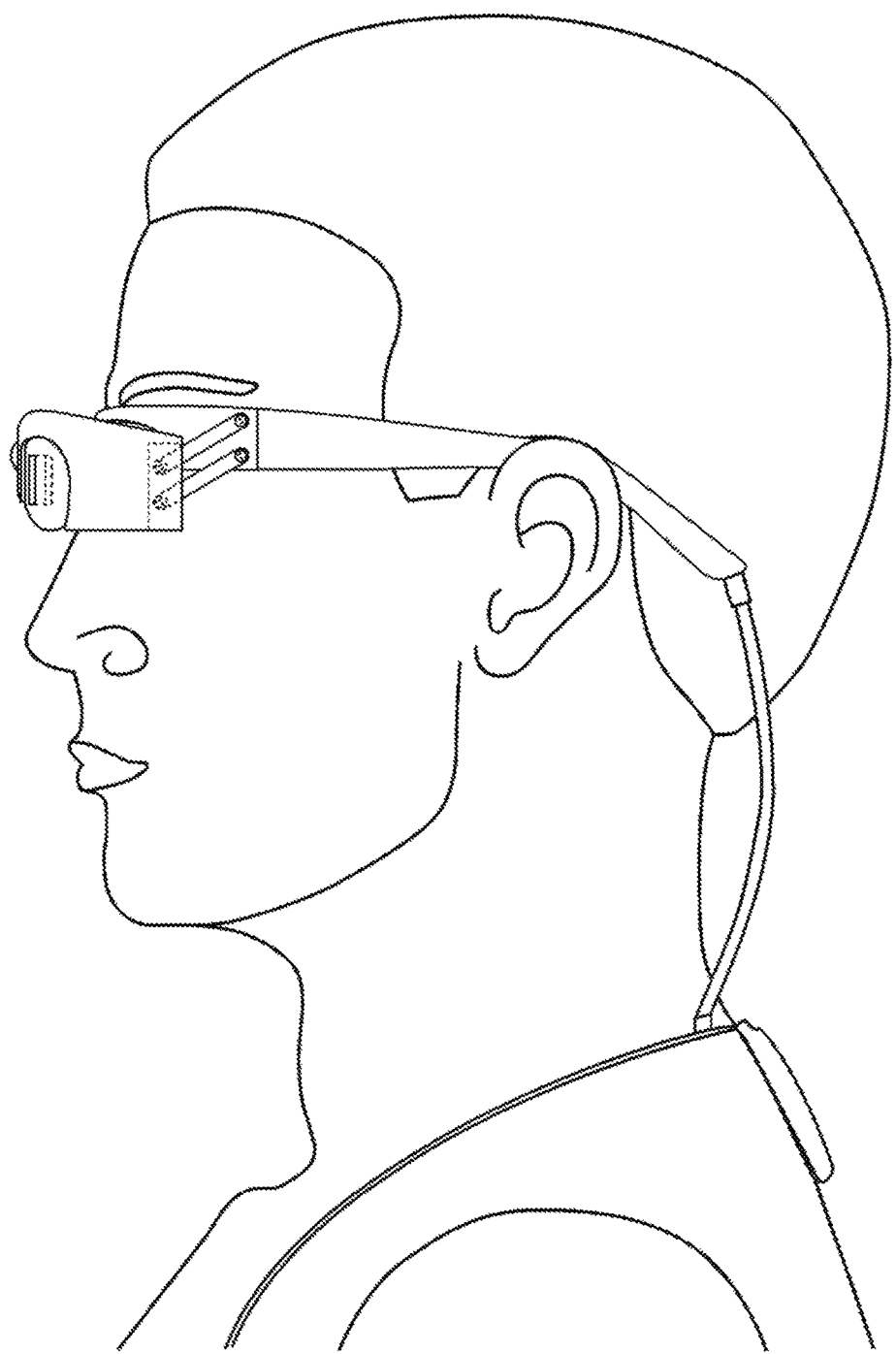
FIG. 15 shows rotary smart glasses according to an embodiment of the invention in an uppermost position on a user.
Figure 16:
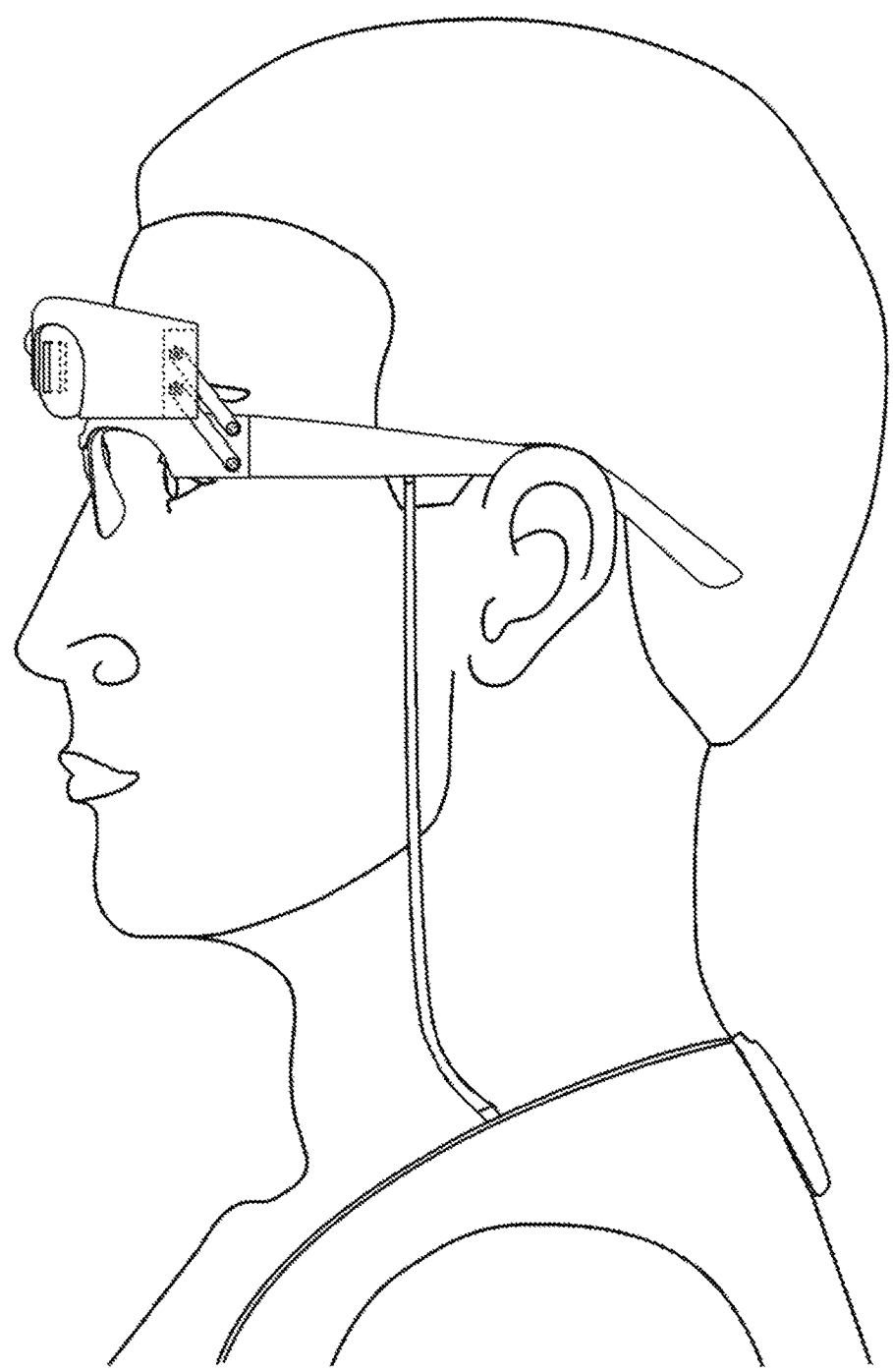
FIGS. 16 and 17 show rotary eyeglasses according to an embodiment of the invention in a middle position on a user.

In some embodiments, the rotary smart glasses may additionally comprise a cord or a wire, which ends are connected to the proximal ends of the bows. The cord may also be connected to the left and right lateral ends of the fixed frame. The cord may be used for connecting to another component of a wearable electronic system Three positions of the displays may be provided, a first position (FIG. 15) is when the movable frame is disposed in front of the user's eyes so that each near-eye display almost totally screens the vision field, like in virtual reality glasses; a second position is when the movable frame is moved up or down by 10 to 30 degrees relative to the first position so that each display partially screens the vision field never impeding straight look, like in augmented reality glasses, and the user may turn their eyes up or down and may see information represented on the displays; a third position is when the movable frame is moved up by more than 30 degrees (FIG. 16) so the user's vision field is almost unobstructed, as the movable frame with the displays disposed on it is located near the user's forehead.

Figure 17:
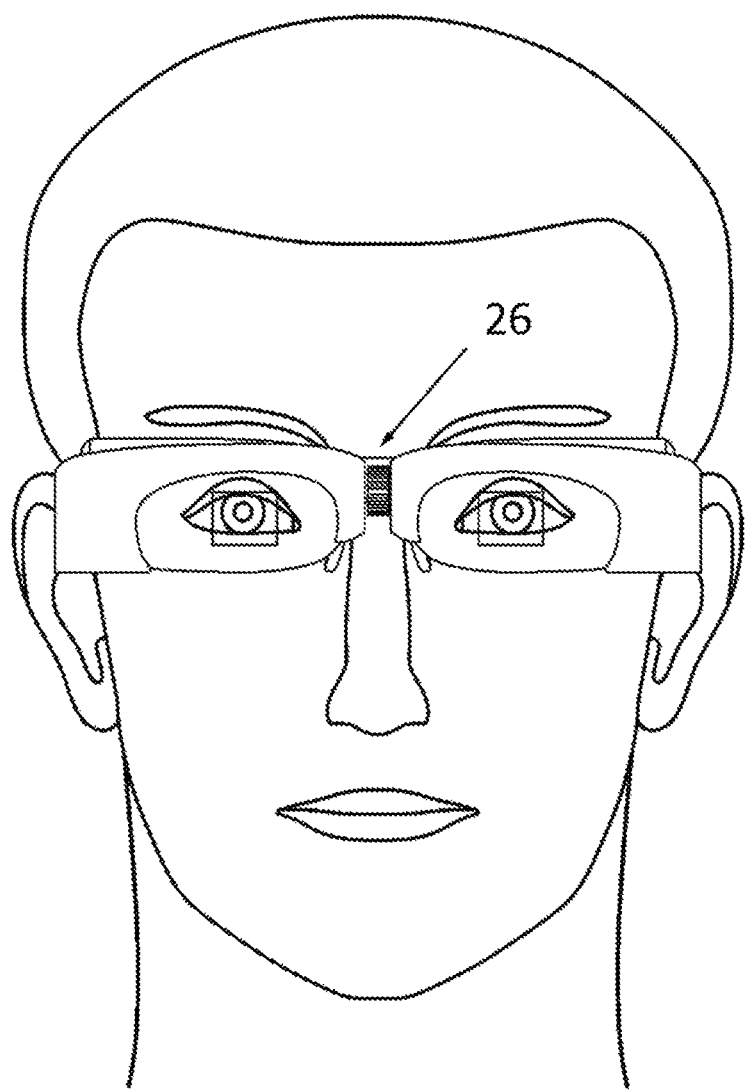

FIG. 17 shows smart glasses, where the movable frame permits adjustment of the distance between the displays, depending on the inter-pupil distance of the user. The nose arch of the movable frame is detachable and includes left and right threaded portions connected together by a nut 26. The user may rotate the nut to adjust the distance between the displays according to their inter-pupil distance. In an alternative embodiment, adjustment of the distance between the optical members may be done by longitudinal sliding the optical members along the movable frame.

In some embodiments (FIG. 13) the neck band is a loop.

The fixed frame may further comprise optical elements in front of the user's eyes for additional accommodation for the displays, the user may read some information from the displays that does not require high definition (like arrows denoting direction of movement, speed indication numbers, etc.) by moving his eyes up, when the movable frame is lifted up. When the movable frame is lowered so that a positive lens mounted on the fixed frame is disposed between the display and the user's eye, an image requiring high definition may be outputted to the display. If the displays are transparent or semi-transparent, it may be expedient to equip them with photochromic elements.

Figure 18:
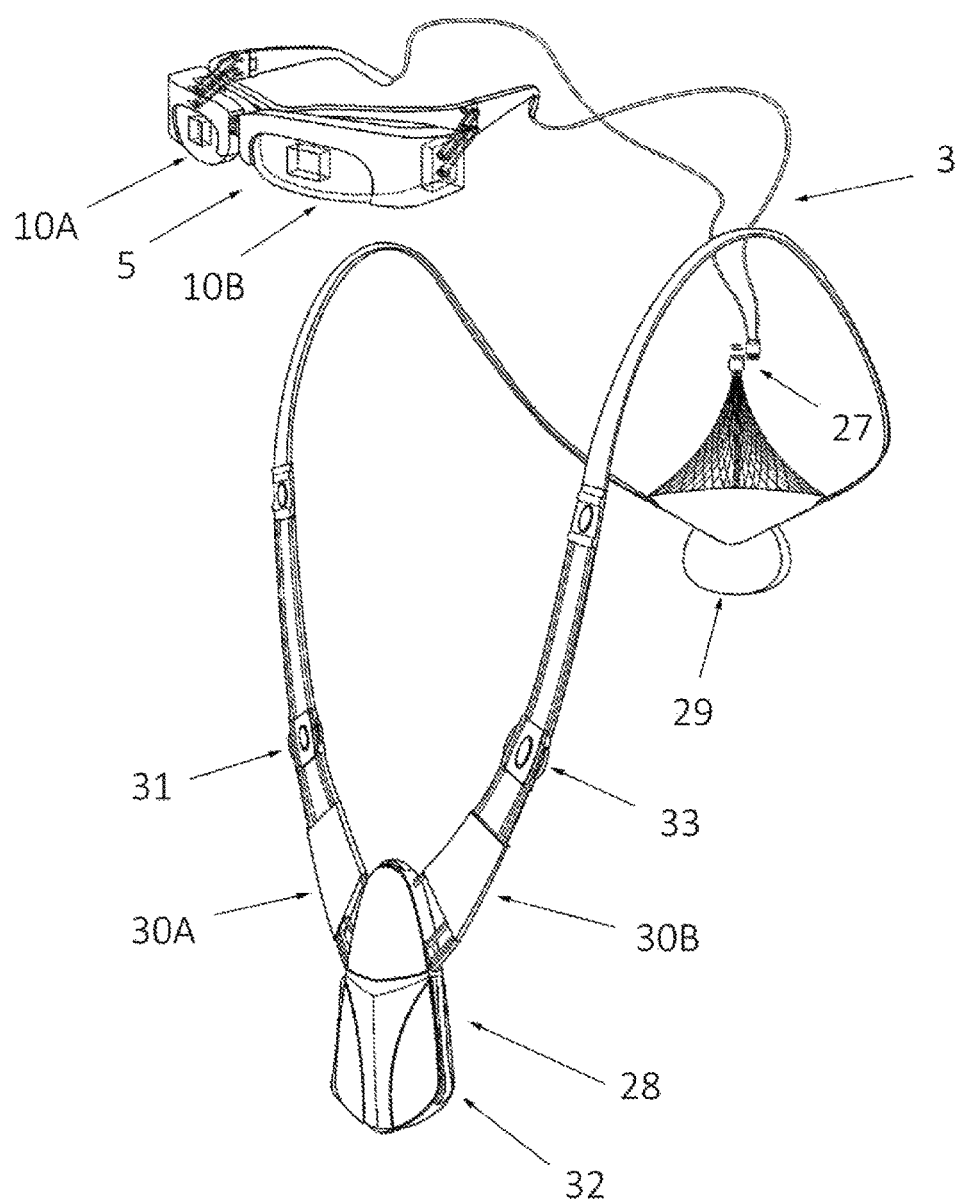
FIG. 18 shows a preferred embodiment of rotary smart glasses with the multifunctional options, according to an embodiment of the invention.

FIG. 18 shows the multifunction wearable device. Near-eye displays 10A, 10B for displaying visual information are mounted on the spectacles 5. Adapter 3 connects the spectacles 5 and neck-loop 1 and the adaptor contains connector 27 for disconnecting the neck band from the spectacle. The neck band comprises electronic units 28, 29, a few batteries 30A, 30B to meet the requirements of energy intensive displays and interface elements 31, 32, 33 configured to enable the user to control the smart glasses by touch under clothing. The smart glasses may further comprise a photo camera, a video camera, microphone array. To ensure a stable signal, the smart glasses can have additional antennas located in the electronic unit 29.

Figure 19:
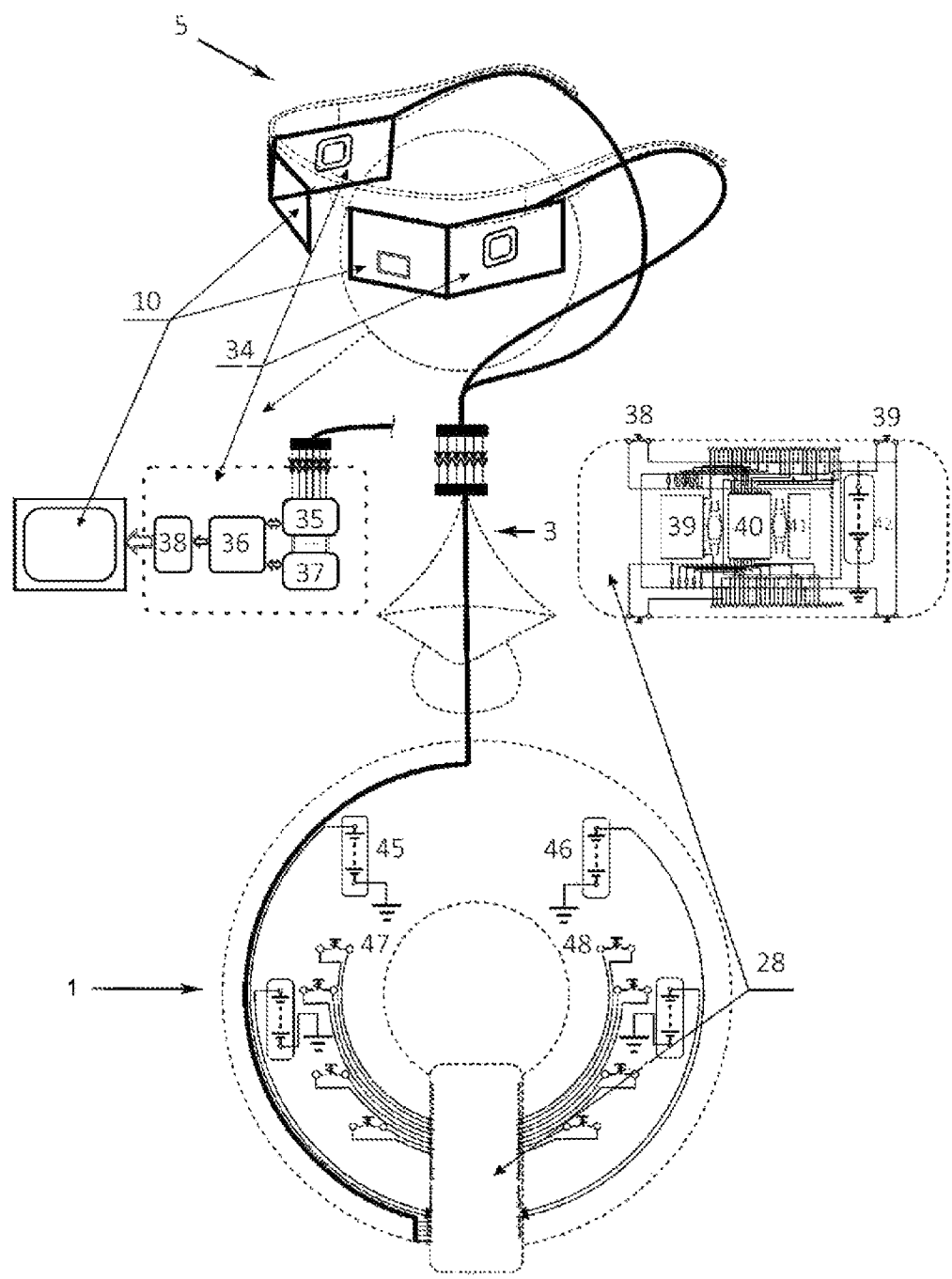
FIG. 19 shows an exemplary circuitry of rotary smart glasses, according to an embodiment of the invention.

A schematic circuit diagram of the smart glasses is shown in FIG. 19. Display electronic control unit 34 and near-eye display 10 are mounted on the spectacles 5. The electronic control unit 34 may include a serial port 35 for commands and data transmission, a signal processor 36, a memory 37, a display controller 38. The electronic control unit may further include a video camera matrix and its controller. Spectacles 5 via an adapter 3 including wires 4A, 4B is connected to the neck-loop 1, which is placed an electronic unit 28 including a serial port for the monitor 39, processor 40, memory 41, an accumulator 42, a set of control buttons, such as 43, 44. It is possible additionally to place on neck loop high capacity batteries, for example 45, 46, and interface buttons 47, 48.

Figure 20:
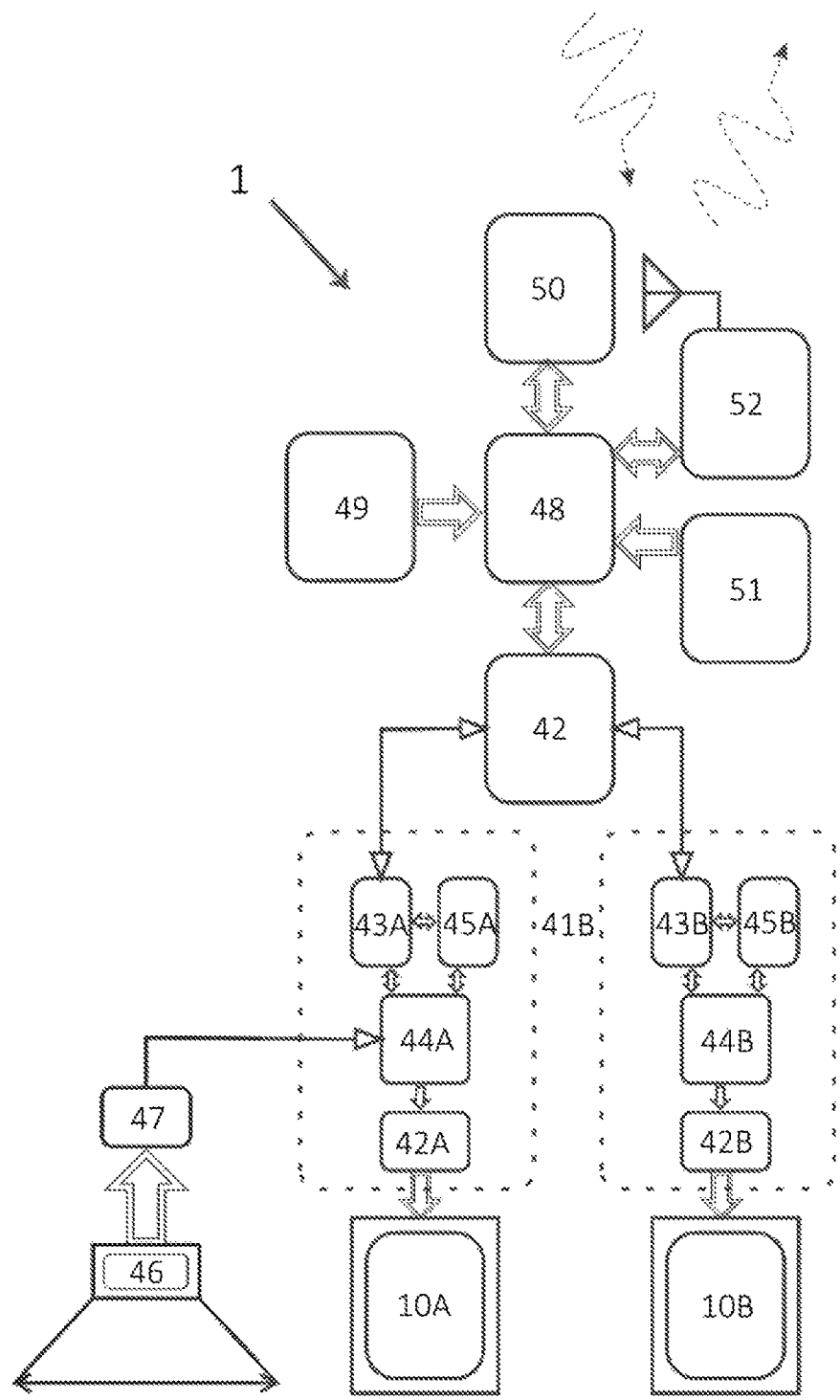
FIG. 20 shows a schematic diagram of rotary smart glasses, according to an embodiment of the invention.

A schematic diagram of the rotary smart glasses is shown in FIG. 20. This embodiment provides two independent channels for data processing, a separate one for each display. The head-mounted part includes two semi-transparent display or two miniature laser projector 10A and 10B simulating displays. The displays are controlled with electronic unit 41A, 41B, 42 comprising monitor controllers, forming strings sweep and transmitting a signal to the display cells.

Signal is transmitted to the controllers via serial ports 43A, 43B. Signal processors 44A, 44B are used for the conversion and processing of data, whose work is supported by the memory chips 45A and 45B. A camera also can be placed on the spectacles frame. The image is projected on a matrix of photodetectors 46. Then the signal is processed by the controller 47 and supplied to the processor 44A.

The diagram also shows the elements of a wearable device mounted on the neck band 1 and on the electronic unit. The neck band electronic unit comprises a processor 48. The user can control a wearable device, including elements placed on either frame, via the buttons and keys 49. Data and control commands exchange between the head-mounted part and the underwear part of the device via the serial port 42. User's data and wearable device software are stored in the memory unit 50. A power supply of all elements of the scheme is provided with batteries placed on the neck band, control and management of power and battery charge are operated by the controller 51. A communication unit is connected with external information space via radio frequency communication element 52.

The rotary smart glasses has ergonomic advantages due to the user interface in which the buttons and keys for managing the whole device placed on the neck band are disposed on the user's body in the region of an isosceles triangle with a horizontal base, lying between the proximal ends of the clavicles, and a vertex directed downward in the region of xiphoid appendix, and slightly higher for women, so that the reach area of the body field of hand movements takes into account the user's clothes not only in a warm, but also in a cold climate, for example, a man in standard European clothes. This allows the user to manage the smart glasses by pressing buttons and keys that are easy to find on the touch over the conventional clothes because they are relatively non-displaceable, projected at about the same place relative to the user's body; the keys are tactilely distinguishable from one another and may provide a feedback in the form of tactile or audible (click) response when pressed.

Direct contact between the under-clothing part of the device and the user's skin allows positioning on it sensors for monitoring the state of user's health, such as temperature, blood pressure, sugar, alcohol in skin secretions, etc., to monitor galvanic skin response for control of the sympathetic nervous system, which allows using the device as a part of a biotelemetry complex for medical diagnostics.

In some embodiments, graphical interface on the screen placed in front of the user's eyes can be managed without taking the electronic block from under the clothes or a phone from the pocket, because the buttons located under clothes can be pressed from outside, over clothes, or by giving voice commands without hand manipulations at all. However, it should be borne in mind that to activate voice commands a button on the neck band still needs to be pressed, which increases the value of the used tactile interface.

With a constantly worn, but nearly invisible, electronic device, the user can receive visual information, be in touch, listen to music, podcasts, and receive current voice and visual information without impairing the user's appearance and differentiating oneself from others.

The smart glasses allows combining an electronic device with jewelry.

The smart glasses can be used as AR-glasses, as an option to a mobile phone, as a component of a wearable mobile complex, comprising a screen and interface on the wrist, head-mounted display connecting with the neck loop comprising the electronic components. The hardware may be distributed to several devices carried by a person, for example, some of hardware and battery base can be accommodated in a man's trouser belt, while the wired connection to the neck band can be implemented in a cord, which lies under the clothes along the user's spine on the back or along the user's stomach; the neck band itself can be a mobile phone (smartphone), while a separately worn keyboard unit can be a wireless interface to it.

Having thus described the invention, it should be apparent to those skilled in the art that certain advantages of the described apparatus have been achieved.

It should also be appreciated that various modifications, adaptations, and alternative embodiments thereof may be made within the scope and spirit of the present invention. The invention is further defined by the following claims.

What is claimed is:
1. A rotary smart glasses comprising:
a neck band with a first electrical connector;
at least one flexible adapter comprising first and second wires;
a spectacles comprising
  (i) a second electrical connector,
  (ii) a fixed frame having left and right lateral ends,
  (iii) a nose abutment connected to the fixed frame at substantially equal distance from the lateral ends,
  (iv) a movable frame having left and right lateral ends and comprising two near-eye displays,
  (v) left and right arms each having a distal end and a proximal end;
wherein the first wire is connected to the first electrical connector at one end, and the other end of the first wire is connected to the second electrical connector,
wherein the first and second wires are connected to the neck band such that points of connection of the first and second wires to the neck band are in close proximity to each other and form a neck wire node,
wherein the first and second wires are mechanically connected to the spectacles forming at least one head wire node,
wherein the proximal ends of the left and right arms are articulated to the left and right lateral ends of the fixed frame, respectively, and distal ends of the left and right arms are articulated to the left and right lateral ends, respectively, so that the articulated joints provide rotation of the left and right arms substantially in parasagittal planes.

2. The smart glasses of claim 1, wherein points of the articulated joints between the arms and the lateral ends of the fixed frame are positioned at a vertical distance of up to 20 mm from a horizontal eye axis.

3. The smart glasses of claim 1, wherein points of the articulated joints between the arms and the lateral ends of the fixed frame are positioned above the horizontal eye axis.

4. The smart glasses of claim 1, further comprising at least one means for locking the movable frame in any position among multiple available positions.

5. The smart glasses of claim 1, wherein the movable frame is adjustable based on a distance between the pupils.

6. The smart glasses of claim 1, wherein the fixed frame further comprises optical members in front of a user's eyes.

7. The smart glasses of claim 1, further comprising right and left bows connected to the left and right lateral ends of the fixed frame, respectively.

8. The smart glasses of claim 7, further comprising a cord connected to the bows.

9. The smart glasses of claim 1, further comprising a cord connected to the left and right lateral ends of the fixed frame.

10. The smart glasses of claim 1, wherein the flexible adapter comprises an electrical connector for disconnecting the neck band from the spectacle.

11. The smart glasses of claim 1, wherein the neck band is a full loop or a half-loop.

12. The smart glasses of claim 1, further comprising at least one electronic unit.

13. A rotary smart glasses comprising:
a neck band with a first electrical connector;
a spectacles comprising
  (i) a second electrical connector,
  (ii) a fixed frame having left and right lateral ends,
  (iii) a nose abutment connected to the fixed frame at substantially equal distance from the lateral ends,
  (iv) a movable frame having left and right lateral ends and comprising two near-eye displays,
  (v) upper left arm, lower left arm, upper right arm, and lower right arm, each having a distal and a proximal end; and
at least one flexible adapter comprising first and second wires;
wherein the first wire is connected to the first electrical connector at one end, and to the second electrical connector at the other end,
wherein the first and second wires are connected to the neck band such that points of connection of the two wires to the neck band are in close proximity to each other and form a neck wire node,
wherein the first and second wires are mechanically connected to the spectacles, thereby forming a head wire node,
wherein the proximal ends of the upper and lower left arms and the upper and lower right arms are articulated to the left and right lateral ends of the fixed frame, respectively, and
the distal ends of the upper and lower left arms and the upper and lower right arms are articulated to the left and right lateral ends of the movable frame, respectively, so that the upper and lower left arms and the upper and lower right arms, and corresponding portions of the right and left lateral ends of the movable frame between the articulated joints, and corresponding portions of the right and left lateral ends of the fixed frame between the articulated joints, form four-link lever mechanisms substantially located in parasagittal planes.

14. The smart glasses of claim 13, wherein the points of the articulated joints between the arms and the lateral ends of the movable frame at the left and right sides are located at a distance not greater than 20 mm.

15. The smart glasses of claim 13, wherein a distance between the articulated joints of the upper and lower arms on each end of the movable frame are greater than a distance between the articulated joints of the upper and lower arms on each end of the fixed frame.

16. The smart glasses of claim 13, further comprising at least one means for locking the movable frame in any position among multiple available positions.

17. The smart glasses of claim 13, wherein the movable frame is adjustable based on a distance between the pupils.

18. The smart glasses of claim 13, wherein the fixed frame further comprises active optical elements in front of a user's eyes.

19. The smart glasses of claim 13, further comprising right and left bows connected to the left and right lateral ends of the fixed frame, respectively.

20. The smart glasses of claim 13, further comprising a cord connected to the left and right lateral ends of the fixed frame.

21. The smart glasses of claim 13, wherein the flexible adapter comprises an electrical connector for disconnecting the neck band from the spectacle.

22. The smart glasses of claim 13, further comprising at least one electronic unit.

23. The smart glasses of claim 13, further comprising a photo camera and/or a video camera mounted on the fixed frame.

* * * * *